(12) United States Patent
Fong

(10) Patent No.: US 11,886,690 B2
(45) Date of Patent: *Jan. 30, 2024

(54) SYSTEM AND METHOD FOR CONTENT SELECTION

(71) Applicant: Comcast Cable Communications, LLC, Philadelphia, PA (US)

(72) Inventor: Joe Y. Fong, San Diego, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,616

(22) Filed: Aug. 18, 2022

(65) Prior Publication Data

US 2022/0391072 A1 Dec. 8, 2022

Related U.S. Application Data

(63) Continuation of application No. 14/251,833, filed on Apr. 14, 2014, now Pat. No. 11,455,086.

(51) Int. Cl.
| | |
|---|---|
| *G06F 3/04842* | (2022.01) |
| *G06F 3/0482* | (2013.01) |
| *G06F 3/04817* | (2022.01) |
| *G06F 3/0489* | (2022.01) |
| *H04L 65/612* | (2022.01) |
| *H04N 21/431* | (2011.01) |

(52) U.S. Cl.
CPC ........ *G06F 3/04842* (2013.01); *G06F 3/0482* (2013.01); *G06F 3/0489* (2013.01); *G06F 3/04817* (2013.01); *H04L 65/612* (2022.05); *H04N 21/4312* (2013.01)

(58) Field of Classification Search
CPC ............. G06F 3/04842; G06F 3/04817; G06F 3/0482; G06F 3/0489; H04L 65/612; H04N 21/4312
See application file for complete search history.

(56) References Cited

U.S. PATENT DOCUMENTS

| | | | |
|---|---|---|---|
| 6,477,123 B1 | 11/2002 | Hutter | |
| 6,782,551 B1 | 8/2004 | Entwistle | |

(Continued)

FOREIGN PATENT DOCUMENTS

| | | |
|---|---|---|
| EP | 1454484 B1 | 9/2004 |
| EP | 1901475 A2 | 3/2008 |

(Continued)

OTHER PUBLICATIONS

European Office Action—EP Appl. 11166793.7—dated Oct. 8, 2015.

(Continued)

*Primary Examiner* — Beau D Spratt
(74) *Attorney, Agent, or Firm* — Banner & Witcoff, Ltd.

(57) ABSTRACT

Methods, systems, and software are described herein for providing a user interface that, in one example, indicates the current point in progress for various items that are available for selection. Upon selection of one of the items of content and/or services that present the items of content, the item of content may be accessed (e.g., for display, recording, or other type of consumption) at the point in progress or at another location within the item of content that may correspond to or otherwise depend upon the point in progress.

46 Claims, 12 Drawing Sheets

(56) References Cited

U.S. PATENT DOCUMENTS

| | | |
|---|---|---|
| 6,925,610 B2 | 8/2005 | Thurston et al. |
| 7,509,663 B2 | 3/2009 | Maynard et al. |
| 7,624,416 B1 | 11/2009 | Vandermolen et al. |
| 7,680,959 B2 | 3/2010 | Svendsen |
| 7,757,250 B1 | 7/2010 | Horvitz et al. |
| 8,095,432 B1 | 1/2012 | Berman et al. |
| 8,180,804 B1 | 5/2012 | Narayanan et al. |
| 8,291,321 B2 | 10/2012 | Matsubayashi |
| 8,302,127 B2 | 10/2012 | Klarfeld et al. |
| 8,397,257 B1 | 3/2013 | Barber |
| 8,554,640 B1 | 10/2013 | Dykstra et al. |
| 8,555,177 B1 | 10/2013 | Junee et al. |
| 8,677,415 B2 | 3/2014 | Angiolillo et al. |
| 8,692,763 B1 | 4/2014 | Kim |
| 8,782,121 B1 | 7/2014 | Chang |
| 8,782,122 B1 | 7/2014 | Chang |
| 8,793,735 B2 | 7/2014 | VanDuyn et al. |
| 8,856,833 B2 | 10/2014 | Conness et al. |
| 8,943,529 B2 | 1/2015 | Kardatzke |
| 9,147,000 B2 | 9/2015 | Vasudevan et al. |
| 9,183,523 B2 | 11/2015 | Cudak et al. |
| 9,246,613 B2 | 1/2016 | McKee et al. |
| 9,247,300 B2 | 1/2016 | Oddo et al. |
| 9,277,472 B1 | 3/2016 | Price et al. |
| 9,342,576 B2 | 5/2016 | Saito et al. |
| 9,407,751 B2 | 8/2016 | Hansen et al. |
| 9,426,509 B2 | 8/2016 | Ellis et al. |
| 9,554,163 B2 | 1/2017 | Ellis et al. |
| 9,626,875 B2 | 4/2017 | Gal et al. |
| 9,826,034 B2 | 11/2017 | Chang |
| 9,832,501 B2 | 11/2017 | Ruffini et al. |
| 10,034,051 B2 | 7/2018 | Card, II |
| 2002/0004742 A1 | 1/2002 | Willcocks et al. |
| 2002/0004748 A1 | 1/2002 | Koga et al. |
| 2002/0085024 A1 | 7/2002 | White et al. |
| 2002/0152224 A1 | 10/2002 | Roth et al. |
| 2002/0152459 A1 | 10/2002 | Bates et al. |
| 2002/0199188 A1 | 12/2002 | Sie et al. |
| 2003/0084448 A1 | 5/2003 | Soundararajan |
| 2003/0145338 A1 | 7/2003 | Harrington |
| 2003/0233278 A1 | 12/2003 | Marshall |
| 2004/0031046 A1 | 2/2004 | Weinblatt et al. |
| 2004/0122736 A1 | 6/2004 | Strock et al. |
| 2004/0203901 A1 | 10/2004 | Wilson et al. |
| 2004/0230484 A1 | 11/2004 | Greenlee |
| 2004/0244030 A1 | 12/2004 | Boyce et al. |
| 2005/0049858 A1 | 3/2005 | Busayapongchai |
| 2005/0114340 A1 | 5/2005 | Huslak et al. |
| 2005/0192000 A1 | 9/2005 | Lloyd |
| 2005/0285739 A1 | 12/2005 | Velhal et al. |
| 2006/0031882 A1 | 2/2006 | Swix et al. |
| 2006/0041478 A1 | 2/2006 | Zheng |
| 2006/0047678 A1 | 3/2006 | Miyazaki et al. |
| 2006/0048184 A1 | 3/2006 | Poslinski et al. |
| 2006/0143236 A1 | 6/2006 | Wu |
| 2006/0143653 A1 | 6/2006 | Suh |
| 2006/0149617 A1 | 7/2006 | Yamashita et al. |
| 2006/0156329 A1 | 7/2006 | Treese |
| 2006/0176398 A1 | 8/2006 | Kang |
| 2006/0225088 A1 | 10/2006 | Gutta |
| 2006/0277100 A1 | 12/2006 | Parham |
| 2007/0061863 A1 | 3/2007 | Rajasekaran |
| 2007/0154168 A1 | 7/2007 | Cordray et al. |
| 2007/0192723 A1 | 8/2007 | Anzelde et al. |
| 2007/0196795 A1 | 8/2007 | Groff |
| 2007/0207780 A1 | 9/2007 | McLean |
| 2007/0294131 A1 | 12/2007 | Roman et al. |
| 2008/0055272 A1 | 3/2008 | Anzures et al. |
| 2008/0083001 A1 | 4/2008 | Peacock et al. |
| 2008/0177617 A1 | 7/2008 | Gupta |
| 2008/0209229 A1 | 8/2008 | Ramakrishnan et al. |
| 2008/0243733 A1 | 10/2008 | Black |
| 2008/0276273 A1 | 11/2008 | Billmaier et al. |
| 2008/0320139 A1 | 12/2008 | Fukuda et al. |
| 2009/0019375 A1 | 1/2009 | Garofalo |
| 2009/0021474 A1 | 1/2009 | Bentley |
| 2009/0083116 A1 | 3/2009 | Svendsen |
| 2009/0083779 A1 | 3/2009 | Shteyn et al. |
| 2009/0089352 A1 | 4/2009 | Davis et al. |
| 2009/0100463 A1 | 4/2009 | St. John-Larkin |
| 2009/0119294 A1 | 5/2009 | Purdy et al. |
| 2009/0132935 A1 | 5/2009 | Van Zwol |
| 2009/0144635 A1 | 6/2009 | Miyazaki et al. |
| 2009/0158326 A1 | 6/2009 | Hunt et al. |
| 2009/0172161 A1 | 7/2009 | Singh |
| 2009/0216577 A1 | 8/2009 | Killebrew |
| 2009/0234876 A1 | 9/2009 | Schigel et al. |
| 2009/0281888 A1 | 11/2009 | Zai et al. |
| 2009/0300670 A1 | 12/2009 | Barish |
| 2010/0023506 A1 | 1/2010 | Sahni et al. |
| 2010/0058376 A1 | 3/2010 | Alhadeff et al. |
| 2010/0083115 A1 | 4/2010 | Park |
| 2010/0122207 A1 | 5/2010 | Kim et al. |
| 2010/0138867 A1 | 6/2010 | Wong et al. |
| 2010/0162289 A1 | 6/2010 | Sanders |
| 2010/0229212 A1 | 9/2010 | Liu et al. |
| 2010/0241699 A1 | 9/2010 | Muthukumarasamy et al. |
| 2010/0250341 A1 | 9/2010 | Hauser |
| 2010/0251305 A1 | 9/2010 | Kimble et al. |
| 2010/0318611 A1 | 12/2010 | Curtin et al. |
| 2010/0325544 A1 | 12/2010 | Alhadeff et al. |
| 2010/0325646 A1 | 12/2010 | Alhadeff et al. |
| 2010/0332330 A1 | 12/2010 | Goel et al. |
| 2011/0035445 A1 | 2/2011 | Eickhoff |
| 2011/0124408 A1 | 5/2011 | Ward |
| 2011/0154213 A1 | 6/2011 | Wheatley et al. |
| 2011/0161148 A1 | 6/2011 | Schmidt |
| 2011/0184792 A1 | 7/2011 | Butcher et al. |
| 2011/0231265 A1 | 9/2011 | Brown et al. |
| 2011/0246908 A1 | 10/2011 | Akram |
| 2011/0264494 A1 | 10/2011 | Lechowicz |
| 2011/0276882 A1 | 11/2011 | Buehler et al. |
| 2011/0312375 A1 | 12/2011 | Kim et al. |
| 2012/0047008 A1 | 2/2012 | Alhadeff et al. |
| 2012/0064820 A1 | 3/2012 | Bemmel |
| 2012/0089705 A1 | 4/2012 | French et al. |
| 2012/0120094 A1* | 5/2012 | Oiwa .................. G06T 11/001 345/593 |
| 2012/0243850 A1 | 9/2012 | Basra et al. |
| 2013/0046772 A1 | 2/2013 | Gu et al. |
| 2013/0057765 A1 | 3/2013 | Zeleznikar |
| 2013/0103628 A1 | 4/2013 | Skelton et al. |
| 2013/0125161 A1 | 5/2013 | Herby et al. |
| 2013/0268966 A1 | 10/2013 | Foote |
| 2013/0297447 A1 | 11/2013 | Sakata |
| 2013/0322850 A1 | 12/2013 | Chang et al. |
| 2013/0325655 A1 | 12/2013 | Wouhaybi et al. |
| 2014/0005814 A1 | 1/2014 | Hwang et al. |
| 2014/0019902 A1 | 1/2014 | DeLuca et al. |
| 2014/0033240 A1 | 1/2014 | Card, II |
| 2014/0046660 A1 | 2/2014 | Kamdar |
| 2014/0075352 A1 | 3/2014 | Hansen et al. |
| 2014/0075385 A1 | 3/2014 | Wan et al. |
| 2014/0123160 A1 | 5/2014 | van Coppenolle et al. |
| 2014/0130076 A1 | 5/2014 | Moore et al. |
| 2014/0132524 A1 | 5/2014 | Lee |
| 2014/0149424 A1 | 5/2014 | Kalmes et al. |
| 2014/0173435 A1 | 6/2014 | Arnold |
| 2014/0201766 A1 | 7/2014 | Stepanov et al. |
| 2014/0215506 A1 | 7/2014 | Kalmes et al. |
| 2014/0331260 A1 | 11/2014 | Gratton |
| 2015/0003595 A1 | 1/2015 | Yaghi et al. |
| 2015/0012416 A1 | 1/2015 | Woods |
| 2015/0066652 A1 | 3/2015 | Collins et al. |
| 2015/0089517 A1 | 3/2015 | Ruffini et al. |
| 2015/0121408 A1 | 4/2015 | Jacoby et al. |
| 2015/0133164 A1 | 5/2015 | Song et al. |
| 2015/0143394 A1 | 5/2015 | Hijikata et al. |
| 2015/0148005 A1 | 5/2015 | Chau et al. |
| 2015/0169189 A1 | 6/2015 | Want et al. |
| 2015/0195621 A1 | 7/2015 | Harron et al. |
| 2015/0199708 A1 | 7/2015 | Ying et al. |
| 2015/0287219 A1 | 10/2015 | Liang et al. |

(56) References Cited

U.S. PATENT DOCUMENTS

| | | |
|---|---|---|
| 2015/0319468 A1 | 11/2015 | Park et al. |
| 2015/0350709 A1 | 12/2015 | Tomita |
| 2016/0063998 A1 | 3/2016 | Krishnamoorthy et al. |

FOREIGN PATENT DOCUMENTS

| | | |
|---|---|---|
| WO | 2007143562 A2 | 12/2007 |
| WO | 2009012048 A2 | 1/2009 |
| WO | 2011002572 A1 | 1/2011 |

OTHER PUBLICATIONS

Canadian Office Action—CA Application No. 2740650—dated Feb. 28, 2017.
European Summons to Oral Proceedings—EP Appl. 11166793.7—dated Apr. 12, 2017.
Feb. 2, 2018—Canadian Office Action—CA 2,740,650.
EP 11166793.9-221 Search Report dated Aug. 5, 2011.
Entertainment Fiend: Keep Track of Watched TV Show Episodes and Movies and Plan What to Watch! dated Apr. 11, 2008, http://entertainmentfiend.blogspot.com/2008/04/keep-track-of-watched-tv-show-episodes.html, retrieved Jul. 31, 2014, 4 pages.
Entertainment Fiend: Keep Track of Watched TV Show & Movies and Plan What to Watch—Updated for 2011 Edition, dated Oct. 13, 2011, http://entertainmentfiend.blogspot.com/2011/10/keeping-track-of-watched-tv-shows.html, retrieved Jul. 31, 2014, 2 pages.
Alan Henry. How to Track All Your TV Shows So You Never Miss an Episode, Lifehacker, http://lifehacker/how-to-track-all-your-tv-shows-so-you-never-miss-an-epi-1180239026, 2013, 11 pages.
Thorin Klosowski. Netflix Profiles Ensure Roommates Won't Mess Up Your Recommendations, Lifehacker, http://lifehacker.com/netflix-profiles-ensure-roommates-wont-mess-up-your-re-987927584, dated Aug. 1, 2013, 11 pages.
Feb. 21, 2019—Canadian Office Action—CA 2,740,650.
Mar. 12, 2020—Canadian Office Action—CA 2,740,650.
R. Gaglianello, L. Spergel and D. Liu, "Convergence of telephony and television: More than a computer on your TV," 2009 IEEE International Symposium on Broadband Multimedia Systems and Broadcasting, Bilbao, 2009, pp. 1-7, doi: 10.1109/ISBMSB.2009.5133763. (Year: 2009).
J. B. Carlucci, "Social Media Television in Today's Cable Systems," 2010 7th IEEE Consumer Communications and Networking Conference, Las Vegas, NV, 2010, pp. 1-5, doi: 10.1109/CCNC.2010.5421636. (Year: 2010).
D. C. A. Bulterman, P. Cesar, A. J. Jansen, H. Knoche and W. Seager, "Enabling Pro-Active User-Centered Recommender Systems: An Initial Evaluation," Ninth IEEE International Symposium on Multimedia Workshops (ISMW 2007), Beijing, 2007, pp. 195-200, doi: 10.1109/ISM.Workshops.2007.41. (Year: 2007).
P. Cesar, D. C. A. Bulterman and A. J. Jansen, "Social Sharing of Television Content: An Architecture," Ninth IEEE International Symposium on Multimedia Workshops (ISMW 2007), Beijing, 2007, pp. 145-150, doi: 10.1109/ISM. Workshops.2007.34. (Year: 2007).
E. Larson and S. Taulu, "Reducing Sensor Noise in MEG and EEG Recordings Using Oversampled Temporal Projection," in IEEE Transactions on Biomedical Engineering, vol. 65, No. 5, pp. 1002-1013, May 2018, doi: 10.1109/ TBME.2017.2734641. (Year: 2018).
M. Schroder et al., "Building Autonomous Sensitive Artificial Listeners," in IEEE Transactions on Affective Computing, vol. 3, No. 2, pp. 165-183, Apr.-Jun. 2012, doi: 10.1109/T-AFFC.2011.34. (Year: 2011).
Aug. 17, 2022—CA Office Action—CA App. No. 3122547.
N. Howard, "Approach Towards a Natural Language Analysis for Diagnosing Mood Disorders and Comorbid Conditions," 2013 12th Mexican International Conference on Artificial Intelligence, Mexico, Mexico, 2013, pp. 234-243, doi: 10.1109/MICAL.2013.50. (Year: 2013).

\* cited by examiner

SYSTEM AND METHOD FOR CONTENT SELECTION

CROSS-REFERENCE TO RELATED APPLICATIONS

This application is a continuation of and claims priority to U.S. patent application Ser. No. 14/251,833, filed Apr. 14, 2014, which is hereby incorporated by reference in its entirety.

BACKGROUND

Users have a large variety of content options at their disposal. A user often has hundreds of channels, on-demand libraries, and services available to watch at any given time. Sifting through all available content can be difficult, and there remains an ever-present need to simplify a user's process of perusing the available options and selecting content to consume.

SUMMARY

The following summary is for illustrative purposes only, and is not intended to limit or constrain the detailed description.

Some aspects as described herein relate to an approach for presenting a user interface, such as but not limited to a content guide, that indicates, in an efficient and straightforward way, how far along each of a plurality of media items are in their playback. Media items may include, for example, items of content (e.g., audio content, video content, audio/video content, movies, programs, audio content, video games, on-demand content, multicast or otherwise transmitted content, and/or the like) and services that provide items of content (e.g., streaming services, NBC, ABC, CBS, HBO, local channels, etc.). For instance, where content is scheduled to be transmitted beginning at a scheduled start time, a user who wishes to view the content after the scheduled start time may begin viewing the content at the currently-transmitted portion of the content. It may be helpful to inform the user of the current point in progress of the content. This may assist the user in deciding whether the user is interested in consuming the content (which may be more likely if the point in progress is earlier in the content) or in selecting another item of content.

According to some aspects, a user interface may be generated that contains a plurality of representations. At least some of the representations may each correspond to an item of content currently in progress (and/or a service that is currently transmitting an item of content), and may further comprise a progress indicator visually identifying a point in progress of the item of content. A selection may be made of one of the plurality of representations, and in response to the selection, the item of content for the selected one of the plurality of representations may be accessed (e.g., for display, recording, or other type of consumption) beginning at a location within the item of content that corresponds to or otherwise depends upon the point in progress.

In another aspect, a point in progress may be determined, based on schedule information, for each of a plurality of items of content that are currently scheduled to be in progress. A user interface may be prepared and/or displayed indicating the points in progress for all or some (e.g., depending upon user interest) of the items of content. A user selection of one of the items of content may be made. In response to the user selection, the selected item of content may be displayed beginning at the point in progress for the selected item of content.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
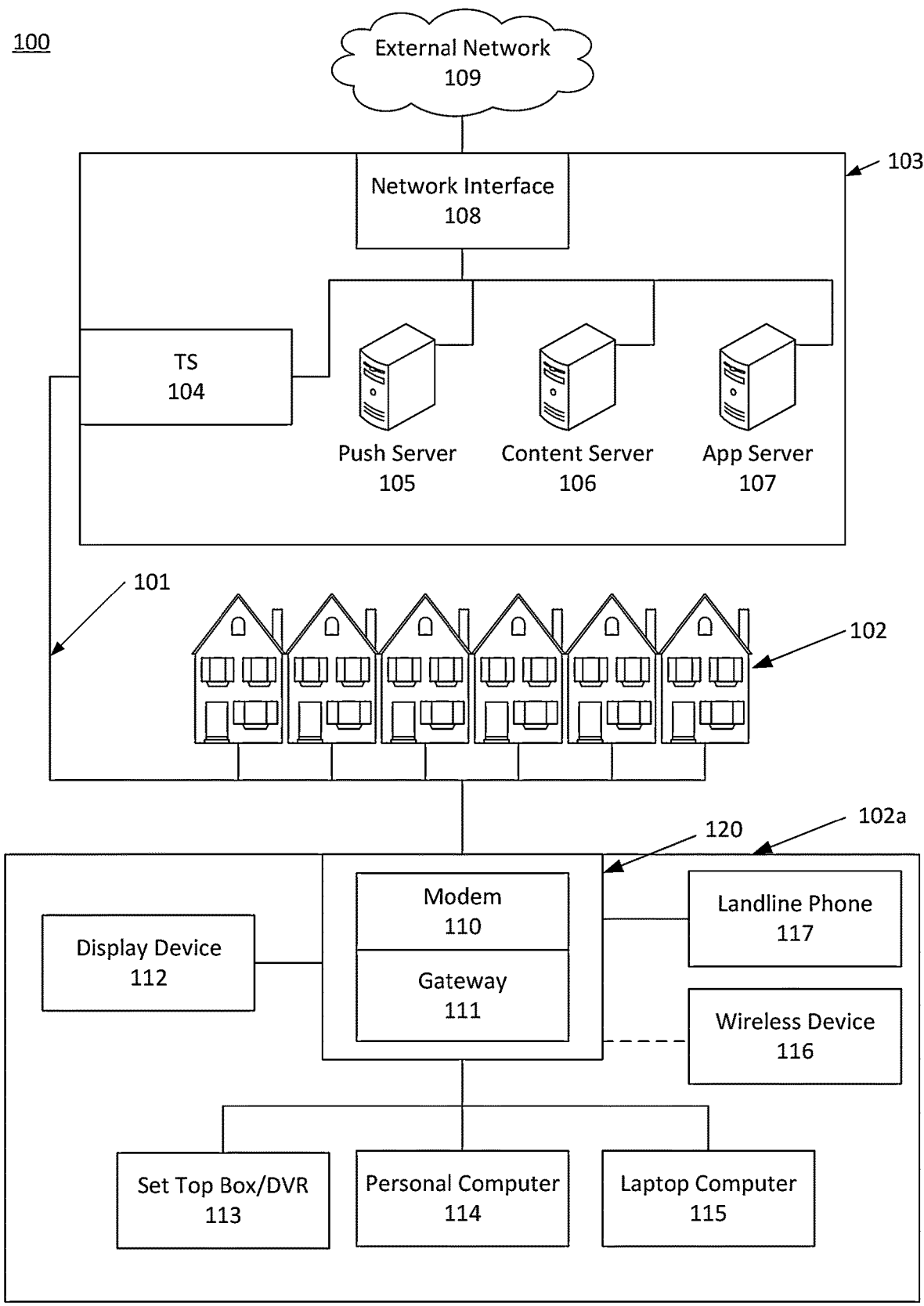
FIG. 1 illustrates an example communication network on which various features described herein may be used.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various features described herein relate to displaying a schedule of available content for a user's consumption. For example, a user interface may display tiles or other visual representations of various media items, such as items of content (e.g., movies, programs, audio content, video games, on-demand content, multicast or otherwise transmitted content, and the like) and/or services (e.g., streaming services, NBC, ABC, CBS, HBO, local channels, etc.) that may be transmitting scheduled or on-demand content, such as weekly program series. The representations (e.g., tiles) may each contain a visual image (e.g., a screen capture of a program, a channel or service logo, a program title, etc.) and/or text corresponding to one of the items of content and/or services, and the user may view the representations through a computer-generated user interface to select an item of content and/or service for consumption (e.g., choosing to watch a particular movie, or choosing to watch NBC). In some embodiments, the individual representations may include program progress indicators of the point in progress of the represented item of content or of an item of content transmitted by the represented service—e.g., how far along the playback is of the item of content. For example, if the current item of content is halfway finished, then the left half of the tile (representing, e.g., the portion of the item of content already transmitted or otherwise presented for consumption) may be displayed in a different color, or otherwise in a different style, from the right half (representing, e.g., the portion of the item of content not yet transmitted or otherwise presented for consumption. For example, the representation may be presented with a color gradient, shading, or other visual modification to the image that depends upon the point in progress. As time goes by, and the item of content progresses, this progress indicator may gradually extend across the entire width of the representation, for example, thereby quickly informing the user about the progress of the item of content. In this manner, the user can quickly determine how much of a current item of content will remain to be seen if the user were to choose that item of content. Moreover, by using such a gradient or other modification integrated into the image or other tile content, screen real estate need not be wasted on providing a progress bar in addition to the image or other tile content.

In some embodiments, one or more previous media items (e.g., items of content and/or services) consumed by the user may be visually differentiated in the user interface. For example, if the user was viewing or otherwise consuming a particular item of content and/or service at the time that he or she opened the user interface (or, in other embodiments, if the user had viewed or otherwise consumed the particular item of content at any previous time), then the tile or other representation for that particular item of content or service may be displayed using a black and white palette (e.g., in black-and-white and/or in grayscale), as opposed to those tiles representing not-previously-viewed content being displayed using, e.g., a color palette. This is merely an example—other types of visual differentiation may be provided. The visual differentiation may help the user as well. For instance, where the visually differentiated item of content or service is one that was being viewed at the time that the graphical interface was opened, then such differentiation may inform the user that selecting this tile (or other representations) would merely result in closing the user interface and returning to the item of content and/or service, with no subsequent changing of the item of content and/or service currently being consumed. Or, where the visual differentiation is to indicate that the item of content or service was previously consumed (but not necessarily while the user interface was opened), then the visual differentiation may serve to inform the user as to which item(s) of content and/or service(s) were already consumed versus those not yet consumed. In some embodiments, the visual differentiation may be provided for any items of content and/or services previously consumed by the user and/or user device. In other embodiments, the visual differentiation may be provided only for those items of content and/or services that were previously consumed within the previous X amount of time (e.g., the previous week, or the previous month, etc.).

In some embodiments, tiles or other representations may be selected via a touch screen (such as by touching one of the tiles), by a mouse interface, and/or the like. Moreover, selection of the tiles or other representations may be made by using a physical key pad shortcut, such as a number key pad and/or an alphabetic keyboard. The user interface may display an array of the tiles (or other representations), such as ten or twelve tiles (merely by way of example), and some or all of those tiles may be mapped to a button (key) on a user's remote control and/or another type of user interface element. For example, the numeric digits (0-9) may be mapped to ten of the tiles, and other keys on the remote control (e.g., a "Back" or "Next" key) may be mapped to other tiles. Each tile may be displayed with a visual overlay of its mapped key (or some other indication of the mapped key), and the user may select a tile by pressing its mapped key. Doing so may result in the display of additional information about the selected tile's corresponding item of content or service (e.g., information describing the item or content or service, or the program currently being transmitted on that service). The user may press the same mapped key again to select the item of content or service and to begin receiving and consuming the item of content, and so the user may not need to move his or her finger in order to both obtain information about an item of content and view or otherwise consume the item of content. Moreover, the mapped button interface (also referred to herein as a quick-tune button interface) may be the same or similar as between multiple devices of the user (e.g., between a cell phone, a tablet computer, a media server, a television, etc.). This may be convenient in that the user may work with the same type of interface seamlessly between devices. These and other features are described in greater detail below.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
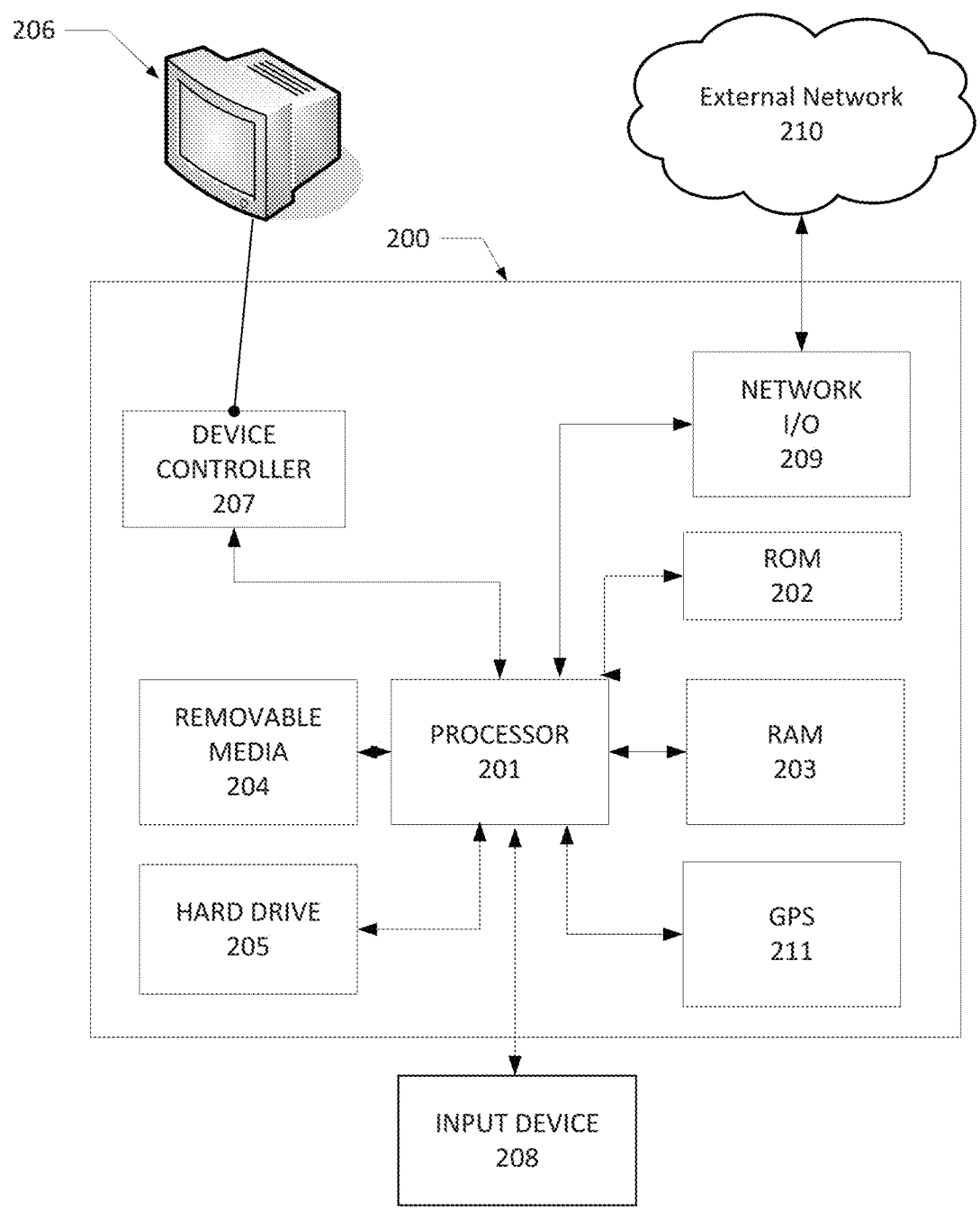
FIG. 2 illustrates an example computing device that can be used to implement any of the methods, servers, entities, and computing devices described herein.

FIG. 2 illustrates general hardware and software elements that may be used to implement any of the various computing devices discussed herein, such as any of the elements of FIG. 1. The computing device 200 may include one or more processors 201, which may execute instructions of a computer program to perform any of the features described herein. The instructions may be stored in any type of computer-readable medium (e.g., memory), to configure the operation of the processor 201. For example, instructions may be stored in a read-only memory (ROM) 202, random access memory (RAM) 203, removable media 204 (such as a Universal Serial Bus (USB) drive, compact disk (CD) or digital versatile disk (DVD), or floppy disk drive), and/or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

One or more of the devices of FIG. 1, such as one or more of the devices at the user premises 102, may be used to obtain, record, display, present, and/or otherwise process content received from the network. The content may be received via, e.g., communication links 101, and may be provided by any one or more sources, such as the content server 106. Examples of content that may be provided to a device include audio content, video content (with or without audio), graphical content, textual content, and/or any other type of data. In addition to the content, the device(s) such as at the user premises 102 may receive information indicating the availability of the content. Such information may be presented by the device such as in the form of a user interface, e.g., a displayed content guide, and information for the user interface may be provided via communication links 101 from the network, e.g., from the push server 105, the content server 106, and/or the application server 107. The user interface may be interactive or passive, and may provide the user with information identifying the content, indicating how to obtain various content, and/or indicating the availability of the content. For example, the user interface may indicate the title of the content, other information about the content, one or more price options for viewing/recording the content, the timeframe within which the content may be viewed, which channel, content provider, or other resource provides the content, and the like. The content may be on-demand content (e.g., provided/transmitted in response to a user request) or scheduled content (e.g., provided/transmitted at a scheduled timeframe regardless of any user requests).

The user interface may also provide status information about content. For example, where content is in-progress (e.g., currently being transmitted, unicast, multicast, and/or otherwise provided), the user interface may include an indication of the point in progress of the content that is currently being provided. For instance, if the content has already begun being provided and is currently 10% through the entirety of the content, then the user interface may include an indication that the point in progress of the content being provided is at a point other than the beginning of the content (e.g., the point in progress is some portion of the content such as 10% complete, with 90% of the content remaining to be provided). The indication may be useful to a user who wishes to begin obtaining (e.g., tuning to, selecting, switching to, etc.) the content in progress, as the point in progress may indicate at what point the user will begin viewing, recording, or otherwise consuming the content in progress.

The user interface may be remotely generated (e.g., by the application server 107, a web server, etc.) and presented for display by the user's device. Alternatively, the user interface may be locally generated by the user's device (although the data for the user interface may still be provided from a remote source such as the application server 107, a web server, etc.). Where the user interface is remotely generated, the user interface may be presented, e.g., as a web page using a web browser at the user's device. Where the user interface is locally generated, the user interface may be locally generated, e.g., by application software locally executed by the user's device, such as a phone or tablet app.

Figure 3:
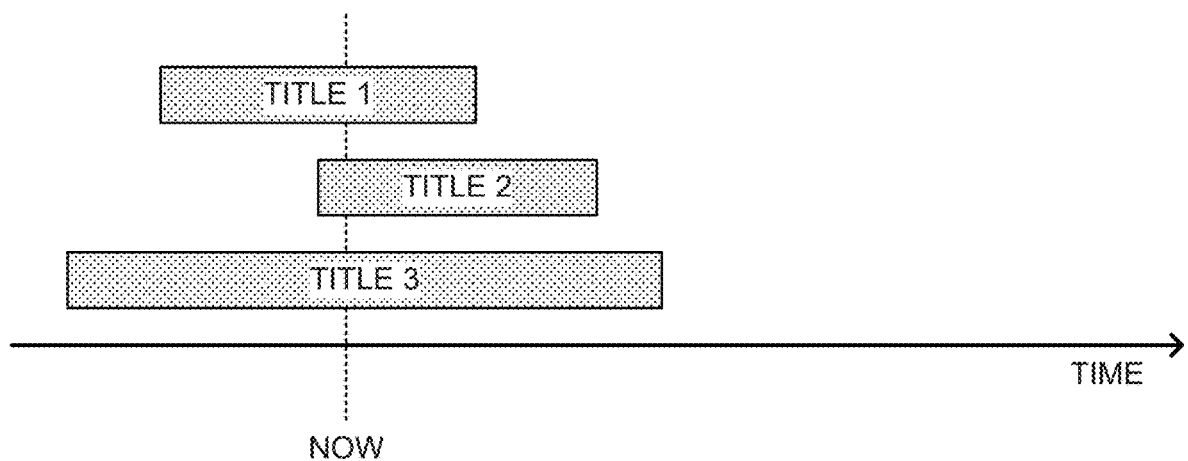
FIG. 3 is an example diagram of various items of content over time, in accordance with one or more aspects described herein.

FIG. 3 graphically shows an example of a point in progress for various content. In the shown example, three items referred to herein as Title 1, Title 2, and Title 3, are being provided at least partially simultaneously in time or having overlapping presentation times. For example, one or more of the three items of content may be transmitted at one or more scheduled times or transmitted at a time in response to a user request (e.g., on-demand). As can be seen in the present example, the three items of content start and end at different times. However, any of the items of content may start and/or end at the same times. Moreover, any of the items of content may have lengths that are the same or that are different from one another. Thus, at any given time, the point in progress may be different for each of various items of content that are in progress.

The point in time labeled "NOW" in FIG. 3 indicates the current time. For example, if a user were to view an interface such as a content guide, and if the user interface indicated the current time to be "NOW," then the point in progress for each of the three items of content can be seen as the locations that the broken vertical line intersects the three items of content in progress. For example, the point in progress for Title 1 is just over halfway (e.g., about 60% progress into the content), the point in progress for Title 2 is near the beginning (about 10% progress into the content), and the point in progress for Title 3 is about halfway (e.g., about 45% progress into the content). As time moves forward, it may be expected that the point in progress for each item of content will also progress forward through the content. However, it is also possible that the point in progress may remain steady, move forward more quickly than in real time, or even move backward, depending upon whether the content is paused, rewound, fast-forwarded, or otherwise modified such as using trick-play functions. Where the content is multicast or otherwise transmitted to multiple users who have no control over the progress of the content, then the point in progress may be expected to move forward at the same rate as real time. While the point in progress has been discussed herein as percentages, the point in progress may be measured in any units, such as a ratio of time elapsed from the beginning of the content to total expected content time, time elapsed from the beginning of the content, expected time remaining to the end of the content, and the like.

Figure 4:
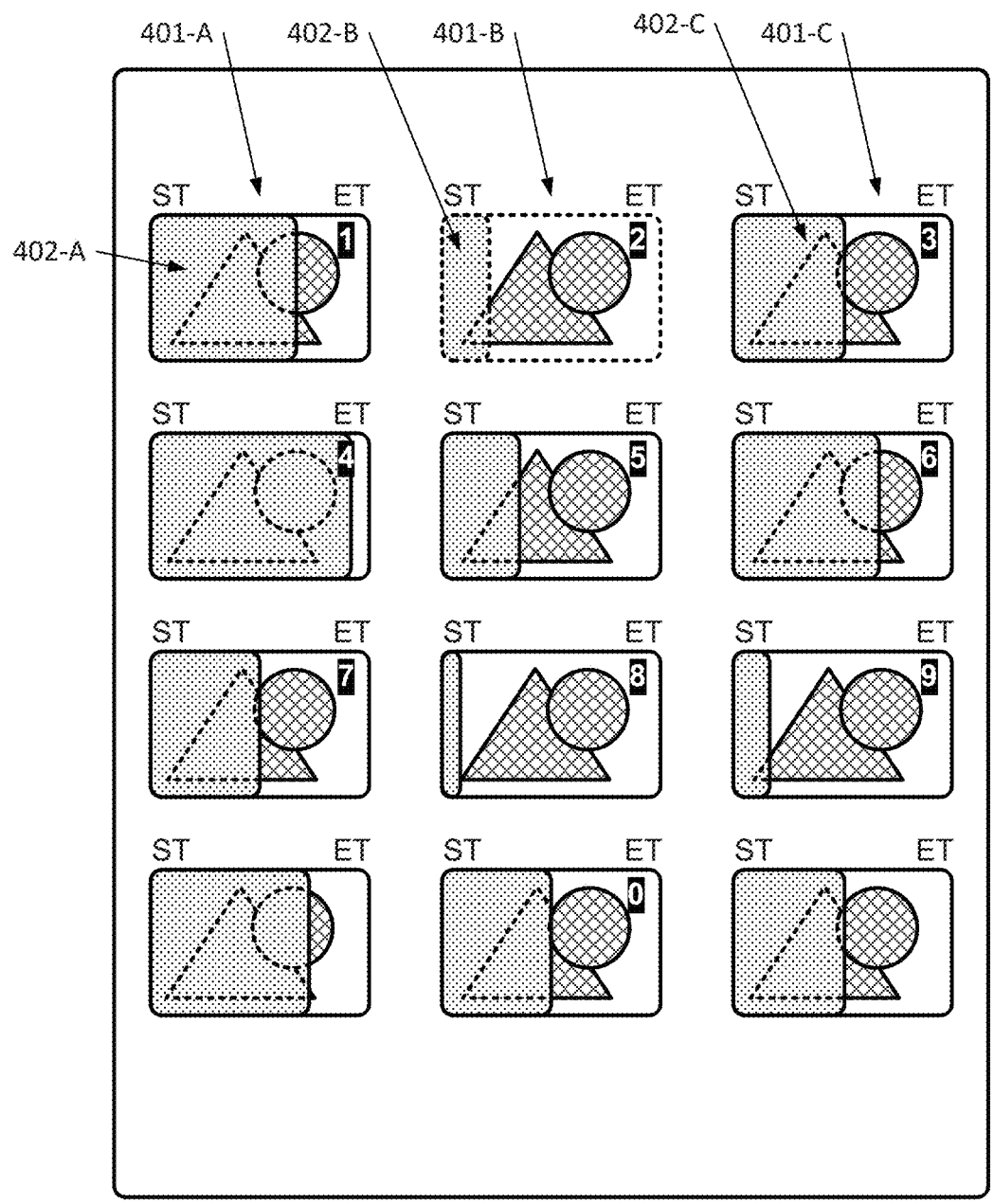
FIGS. 4-9 show various examples of user interfaces that may be presented in accordance with one or more aspects described herein.
Figure 5:
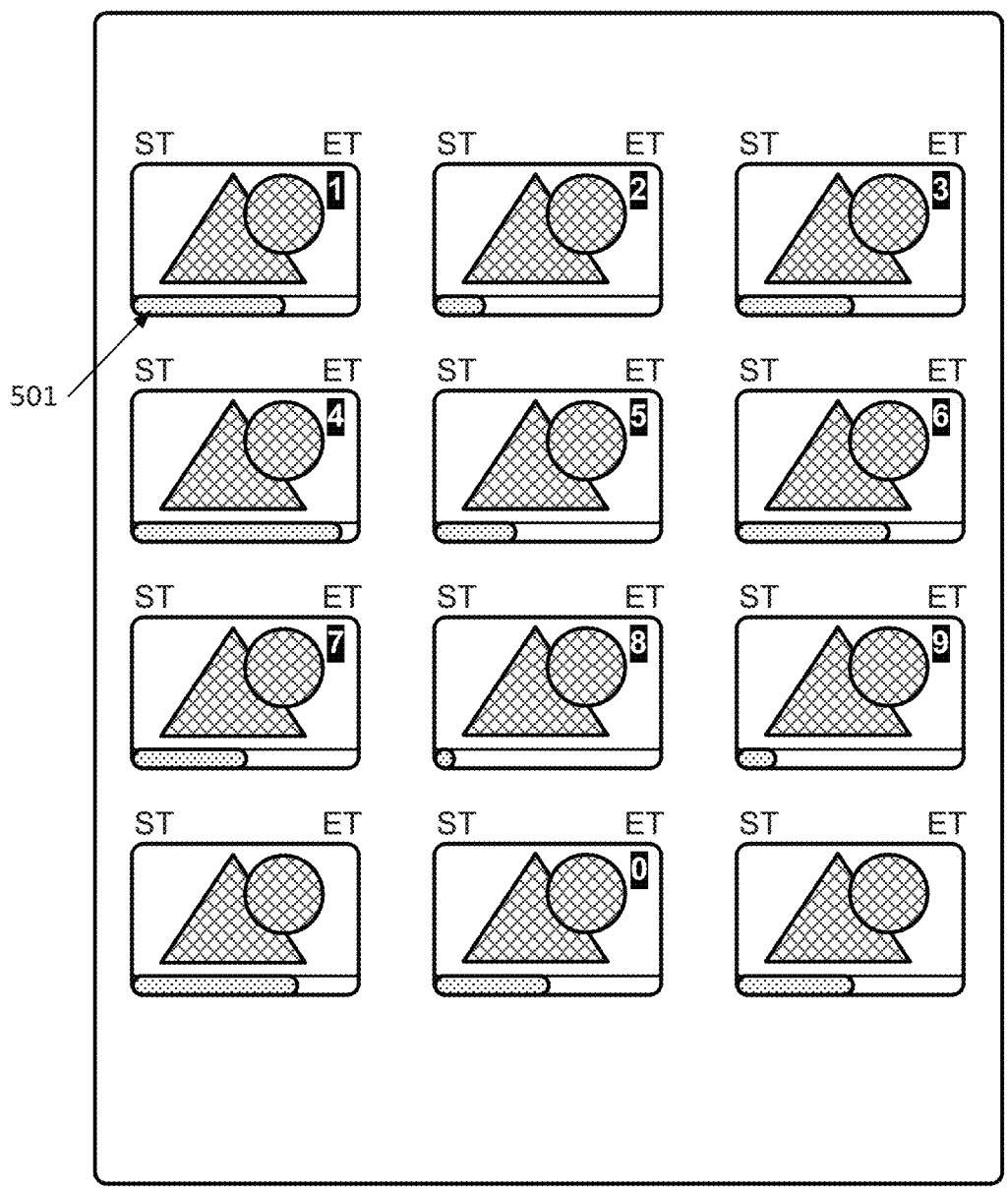

FIG. 4 is an example of a user interface, which may be in the form of a content guide, as presented to a user. In this example, the user interface may include a set of information for each item of content that is indicated by the user interface. By way of example, and in recognition of the tiled layout shown in FIG. 4, the information for a given item of content and/or service will be referred to herein as a tile. Thus, for example, in the shown user interface, twelve items of content and/or services are indicated, with twelve corresponding tiles (including tiles 401-A, 401-B, and 401-C for three of the items of content and/or services). However, the user interface may indicate fewer than nine items of content (fewer than nine tiles) or more than nine items of content (more than nine tiles), as desired. Where there are more tiles than can be comfortably fit on a single screen, the user may be able to scroll through the tiles to show different tiles for different items of content. While a tiled user interface is discussed herein with regard to at least some of the example figures, the features described herein are not limited to tiled user interfaces and may be used in any user interface configuration.

The information for any or all of the media items (e.g., items of content and/or services) may include, for example, an indication of the start time ("ST") and/or the end time ("ET") of the item of content (and/or another predetermined point in the content), an identification of the content (such as by title, screen shot, logo, image, animation, text, etc.), an indication of the service, and/or any other information. In the shown example, a screen shot for each item of content is displayed as part of the corresponding tile. The screen shots are indicated in FIG. 4, for simplicity's sake, as a circle and a triangle. However, it will be understood that the screen shots may be actual screen shots of the individual items of content, such as one or more images taken from the content. Moreover, the screen shots may be screen shots that depend upon the points in progress of the items of content. For example, for a given item of content, the screen shot indicated in the user interface may be a screen shot of the video that is being presented in the content at the point in progress (or at a time that depends upon the point in progress). The screen shot may dynamically update automatically and/or periodically (e.g., every second, every five seconds, every ten seconds, every minute, etc.) while the user interface is being displayed, or the screen shot may remain static as of the time that the user interface is displayed. Where the user interface is refreshed (e.g., by leaving the user interface and then returning to the user interface), the screen shots may also be updated in accordance with the new point in progress. Where a tile represents a service that presents a variety of scheduled items of content, then the screen shot may change to indicate which item of content is currently being transmitted through the service. Where a tile represents a scheduled item of content (e.g., scheduled to be multicast beginning at a particular time and/or within a particular timeframe), that tile may disappear from the user interface if the item of content has ended its scheduled transmission. In either case, the screen shot for a given tile may also dynamically change as the point in progress changes.

The user interface may also indicate the point in progress for each of the items of content. In the example of FIG. 4, the point in progress for each item of content is indicated by displayed progress indicator 402 that may differentiate between a past portion and a future portion of the item of content. The progress indicator may be dynamically updated over time in the displayed user interface as the point in progress changes. In this example, the progress indicators are each a shaded or otherwise visually distinguished region of the screen shot and/or of the tile itself. For example, shaded regions 402-A, 402-B, and 402-C are shown in FIG. 4. The sizes and/or shapes of the regions 402 may depend upon the point in progress for each of the items of content. For instance, in the present example, the three items of content associated with tiles 401-A, 401-B, and 401-C, respectfully, are the same items of content as Title A, Title B, and Service 1 of FIG. 3. As can be seen, the portions 402 of the screen shots or tiles that are shaded correspond to the points in progress for the respective items of content Title A, Title B, and the item of content currently being transmitted through Service 1. Specifically, in this example, approximately 60% of the screen shot or tile for Title A (information 401-A) is shaded or otherwise visually distinguished, approximately 10% of the screen shot or tile for Title B (information 401-B) is shaded or otherwise visually distinguished, and approximately 45% of the screen shot or tile for item of content being transmitted through Service 1 (information 401-C) is shaded or otherwise visually distinguished, thus corresponding to the example points in progress as discussed previously with reference to FIG. 3. By shading an image in a tile or other representation (and/or the tiles or other representations, or portions thereof to indicate the point in progress, this may save valuable screen real estate. In contrast, if a progress bar were displayed next to a representation, the progress bar may require additional screen space to display the progress bar. Or, even if the progress bar were overlaid on a tile, the tile might need to be made bigger to account for what might be otherwise hidden by the progress bar. Thus, the tiles may potentially be made smaller by integrating the point in progress indication with the tile image and/or portion thereof, such as by shading, modifying a color palette, modifying a tint, modifying a brightness, and/or otherwise visually modifying a portion of the image (e.g., portion 402A), where the size and/or position of the portion depends upon the point in progress. As will be described below, there are other ways of visually modifying a tile, such as by modifying the tile's boundaries and/or other visual properties and/or providing a progress line, to indicate the point in progress.

The user may select one of the items of content and/or services in any of a number of ways. For example, where the user interface is displayed on a touch-sensitive display device, the user may be able to simply touch the desired tile. In response, further information about the item of content and/or the service providing the item of content may be presented and/or the item of content itself may be presented to (e.g., viewed by) the user. The presentation of the item of content may be on the same display device as the user interface and/or on a separate device. Where the user interface is displayed on a computer having a mouse input device, the user may be able to hover over and/or click on the indicated tile for further information and/or to view the associated item of content. In still further examples, tiles may be selected using other user input means, such as hand waving/pointing gestures (e.g., where the device includes a camera), audio input (where the device includes a microphone and speech recognition functionality), and the like.

The tiles may also be selected using a remote control, keyboard, or other button-centric input device. To make this easier, the example user interface of FIG. 4 may include quick-select indicators for at least some of the items of content and/or their respective tiles. In this example, nine of the tiles are associated with a displayed indication of a numeral (zero through nine). These quick-select indicators may indicate to the user a button on a user interface device (e.g., by pressing the indicated numeric button of a remote control or keyboard) to select the associated item of content. For example, if the user presses the "0" button of the remote control or keyboard, then associated Title A may be presented to the user (or information about Title A). Likewise, in this example, if the user presses the "1" button of the remote control or keyboard, then associated Title B may be presented to the user (or information about Title B). As the user scrolls through the user interface, the quick-select indicators may be associated with (and displayed in conjunction with) different ones of the items of content and/or services. While numerals are discussed herein as example quick-select indicators, other symbols may be used. For example, letters, colors, and/or graphical symbols may be used as quick-select indicators. In general, it may be desirable for the layout of the quick-select indicators to match the physical layout of buttons on the user input device (e.g., the remote control or keyboard). Also, two-digit or longer numbers, letter combinations, or the like may be used as quick-select indicators.

Figure 15:
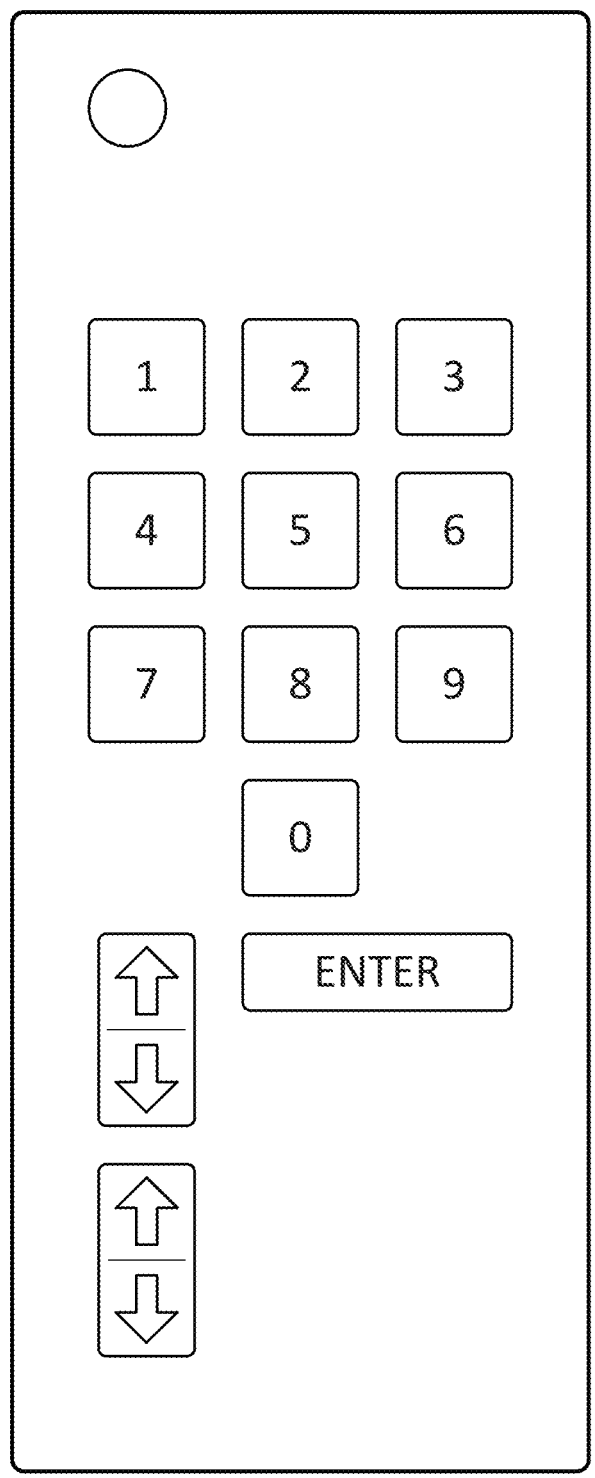
FIG. 15 is an example of a remote control device that may be used in accordance with one or more aspects described herein.

In the example shown, some or all of the quick-tune button mappings may be arranged on the display relative to each other in the same order that the buttons are available to the user. For example, where a remote control being used with the interface has buttons with the top row "1 2 3," the next row down "4 5 6," the next row down "7 8 9" and a bottom "0" button, then the mappings may also be presented in the user interface in the same physical order and layout. An example of such a remote control layout is shown in FIG. 15. Such a layout is also matched in FIGS. 4-8, in which the top row of tiles is mapped to buttons 1, 2, and 3, the next row of tiles is mapped to buttons 4, 5, and 6, the next row of tiles is mapped to buttons 7, 8, and 9, and one of the next row of tiles is mapped to button 0. In matching the button layout with the mapping layout of the interface, this may allow the user to slide his or her or thumb from one button to the next on the remote control without needing to look at the remote control. This may be especially true where the user is very familiar with the button layout of the user device, such as a cellular phone or remote control device that is used on a regular basis.

To match the layout of the mapped representations on the user interface with the layout of the mapped buttons on the remote control (or other user device), one or more computing devices (e.g., the device presenting the user interface and/or the user device containing the buttons) may determine the layout of the buttons. This may be done, for instance, by the computing device presenting the user interface communicating with the remote control or other user device that contains the buttons and/or by receiving the layout via user input. Where the user identifies the layout of the buttons, the user may do so directly (e.g., by graphically indicating where the buttons are located) and/or by identifying the device that contains the buttons, such as by make and model. Where the device is identified such as by make/model, then the computing device presenting the user interface may have access to a lookup table that associates, e.g., makes/models of devices with respective button layouts. Where the computing device presenting the user interface is also the same device that contains the buttons, then the computing device may already be pre-programmed with the button layout. While certain embodiments are described herein as matching the layout of the user interface representations with the layout of the mapped buttons, there may be variations such that the matching is not perfect or even similar. Thus, more generally, the layout of the representations in the user interface may be made so as to depend upon the determined layout of the mapped buttons of the user device.

In FIG. 4, the regions 402 are shaded to indicate the points in progress. However, other visually distinguishing features may be used to indicate the points in progress. For example, the regions 402 may be displayed with altered colors, altered brightness, and/or altered contrast, as semi-transparent overlays, as black-and-white regions (where the screen shot is in color), as color regions (where the screen shot is black-and-white, and the like. In any of these examples, the point in progress for each item of content may be indicated by visually distinguishing a portion of the screen shot (or of moving video, animation, a logo, graphics, text, etc.), where the size of the visually distinguished portion depends at least partially upon the point in progress for the item of content.

Moreover, the point in progress may be indicated in other ways besides visually distinguishing a portion of a screen shot or other image/video. For example, referring to FIG. 5, the point in progress may be visually indicated by a progress indicator, such as a progress bar 501, where the length and/or other dimension of the progress indicator (e.g., bar) depends at least partially upon the point in progress for the item of content. While the progress bar 501 is shown at the bottom of a tile, the progress bar 501 or other indicator may be presented at any location relative to the tile (inside or outside the tile), such as at the top, in the middle, or on the left or right sides. Moreover, the progress bar or other indicator may be vertical rather than in the horizontal configuration shown in FIG. 5.

Figure 6:
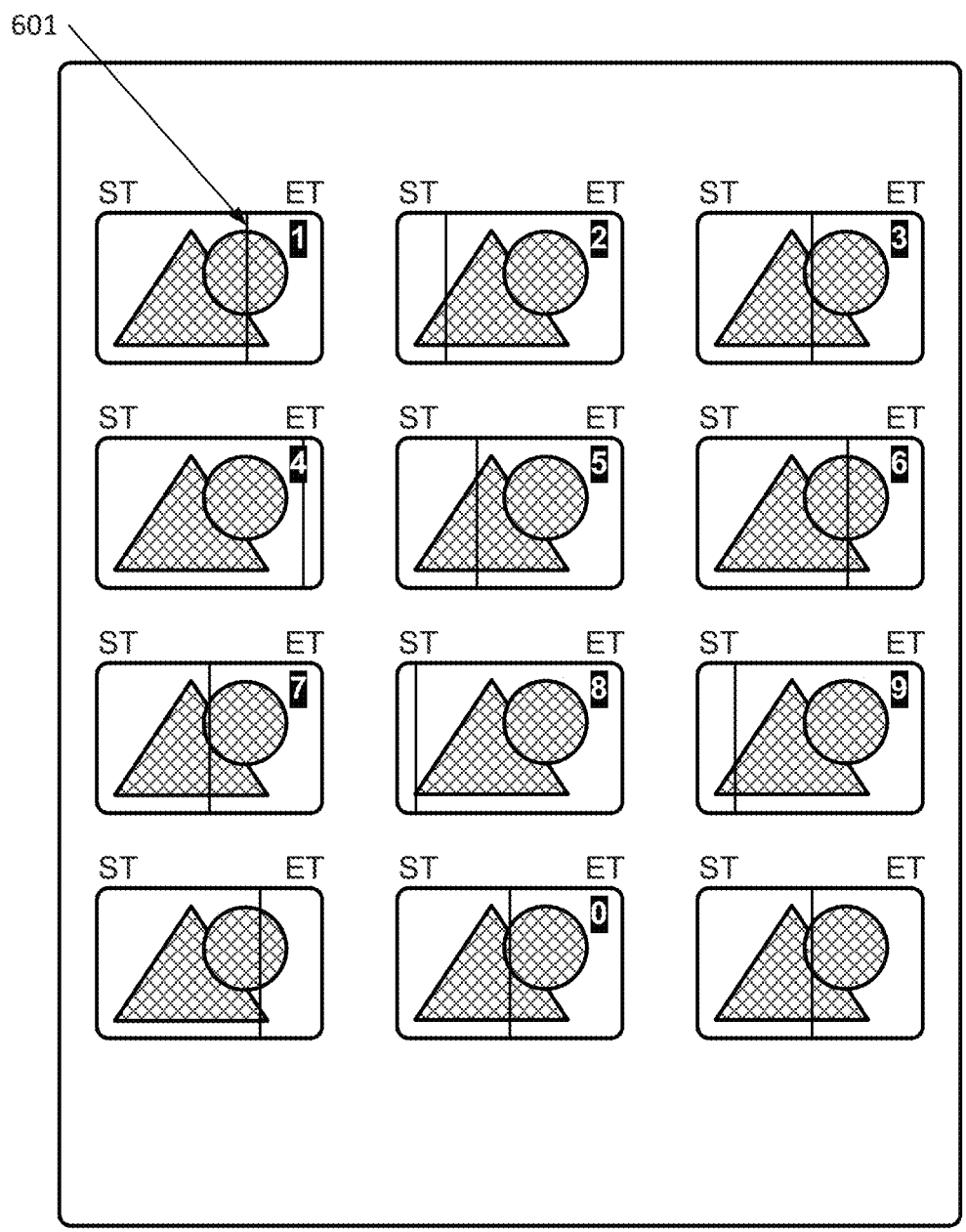

Another example of how to indicate points in progress of items of content is shown in FIG. 6. In this example, the points in progress are each visually indicated by a progress indicator such as a vertical line (e.g., progress line 601) extending through the tile, screen shot, video, and/or other information for the item of content, where the horizontal position of the line depends at least partially upon the point in progress for the item of content. For example, where the point in progress of an item of content is close to 0%, the progress line 601 or other progress indicator may be near the left side of the tile for the item of content. As the point in progress advances toward 100%, the progress line 601 or other progress indicator may correspondingly advance toward the right side of the tile. In other configurations, the progress line 601 may be a horizontal line, where the vertical position of the line or other progress indicator relative to the tile depends at least partially upon the point in progress for the item of content (where, e.g., the horizontal line advances from top to bottom as the point in progress advances). In either case, because the progress line 601 may be relatively thin, it may be expected not to block the underlying image in any significant way. Moreover, because the progress line 601 may be overlaid on the image of a tile (or other representations), the progress line 601 may not take up any additional screen space.

Figure 7:
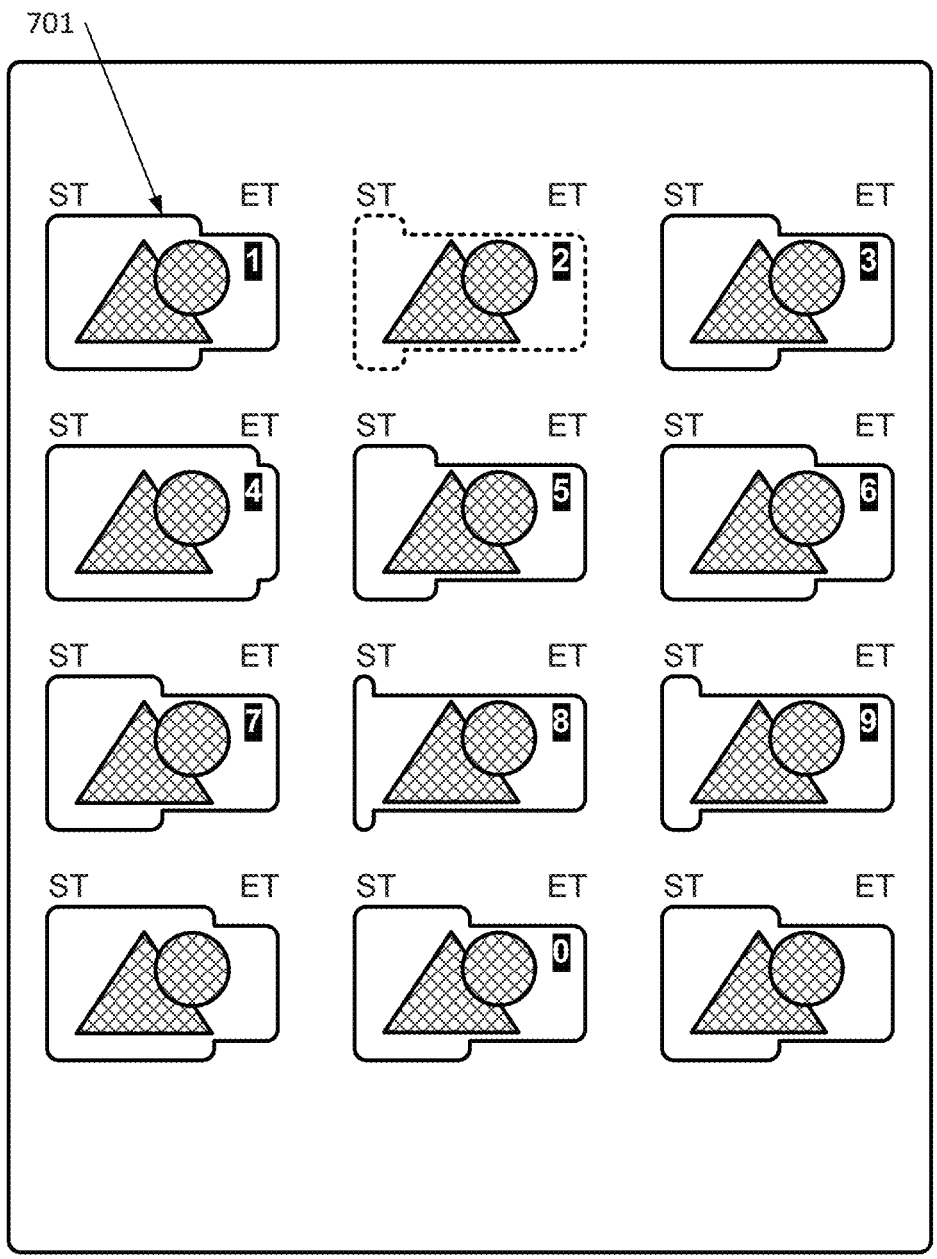

Yet another example of how to indicate points in progress of content items is shown in FIG. 7. In this example, the points in progress are each visually indicated by altering one or more boundaries (e.g., upper boundary 701) of the tile, screen shot, video, image, logo, or other indication of the item of content. For example, the upper boundary 701 is taller on a left portion and lower on a right portion, where the upper boundary 701 becomes lower at a left-right location that depends at least partially upon the point in progress for the item of content. As the point in progress advances in time, the location at which the upper boundary 701 becomes lower may correspondingly advance toward the right side of the boundary 701. This may be applied to any one or more of the boundaries of a representation, including but not limited to the upper boundary 701, a lower boundary, and/or one or more side boundaries. Moreover, depending upon which of the boundaries are modified and/or how they are modified to indicate the point in progress, the overall size of the representation may also change with the point in progress.

Figure 8:
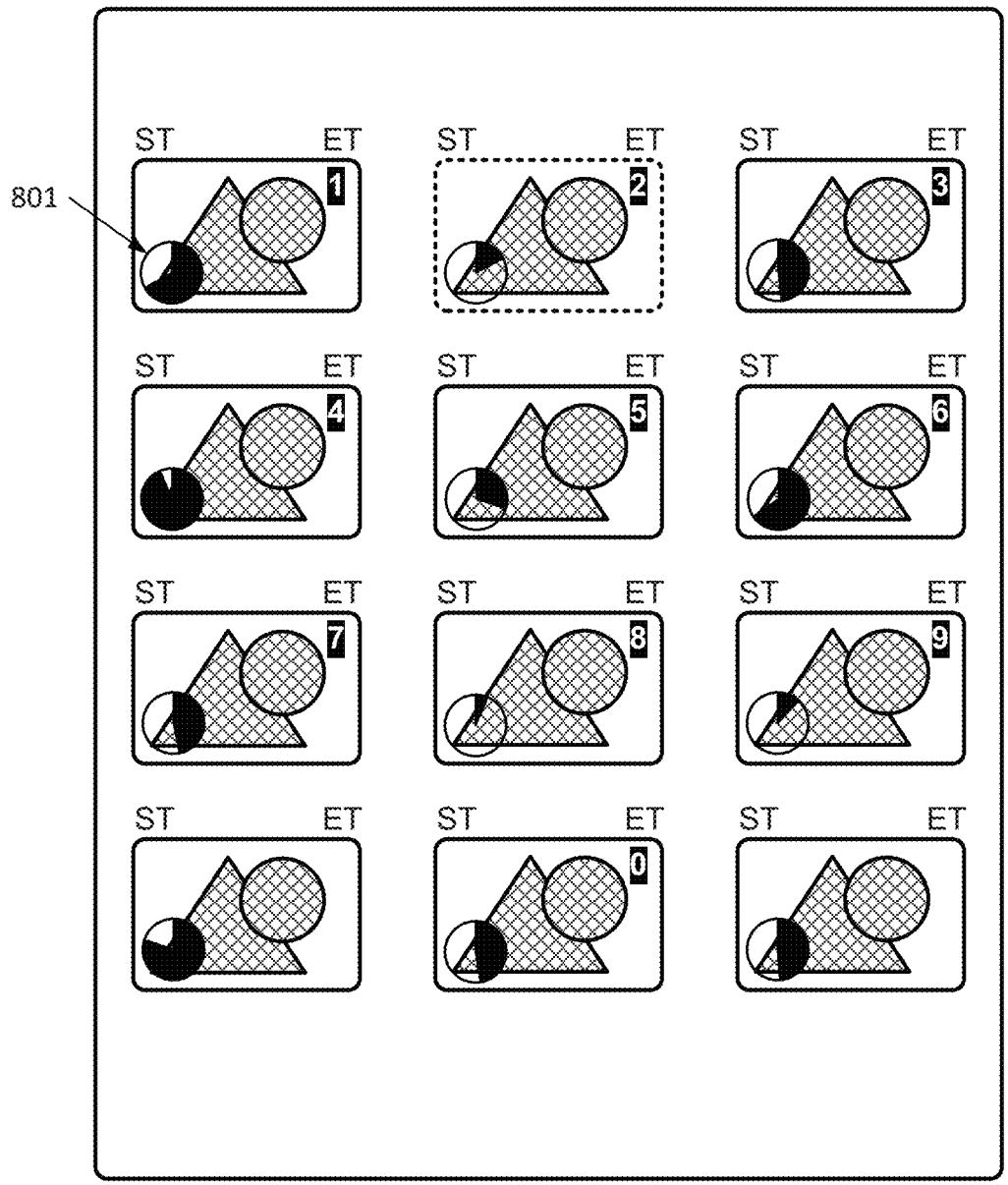

Another example of how to points in progress of content items may be indicated in a user interface is shown in FIG. 8. In this example, the points in progress are each visually indicated by a progress indicator such as a pie chart indicator 801. In this example, the pie chart indicator 801 has two portions that are visually distinguishable from each other (e.g., with one portion darker than the other and/or a different color and/or pattern than the other). One portion (in this example, the darker portion) may indicate the progress so far (the point in progress), and the other portion (in this example, the lighter portion) may indicate the content remaining from the point of progress to the end of the content. The relative areas between the two portions of the pie chart indicator 801 may indicate the relative ratio of the progress made so far (the point in progress) versus the amount of content remaining from the point in progress. There are many variations that may be used. For example, rather than a circular pie chart, the progress indicator may be an arc (filled or unfilled) that increases in arc angle in conjunction with the point in progress. Or, the progress indicator may be of a different shape (e.g., square, rectangular, oval, or any geometric or non-geometric shape) in which the area within the shape is filled and/or patterned in such a way as to indicate the amount of progress made through the content. Thus, one example variation of such a filled shape may include the progress bar 501. While the pie chart indicator 801 is shown at a particular location relative to the tile with which it is associated, the pie chart indicator 801 (or any other progress indicator) may be located at any position within, outside, overlapping, and/or around the tile or other displayed information associated with the item of content.

Figure 9:
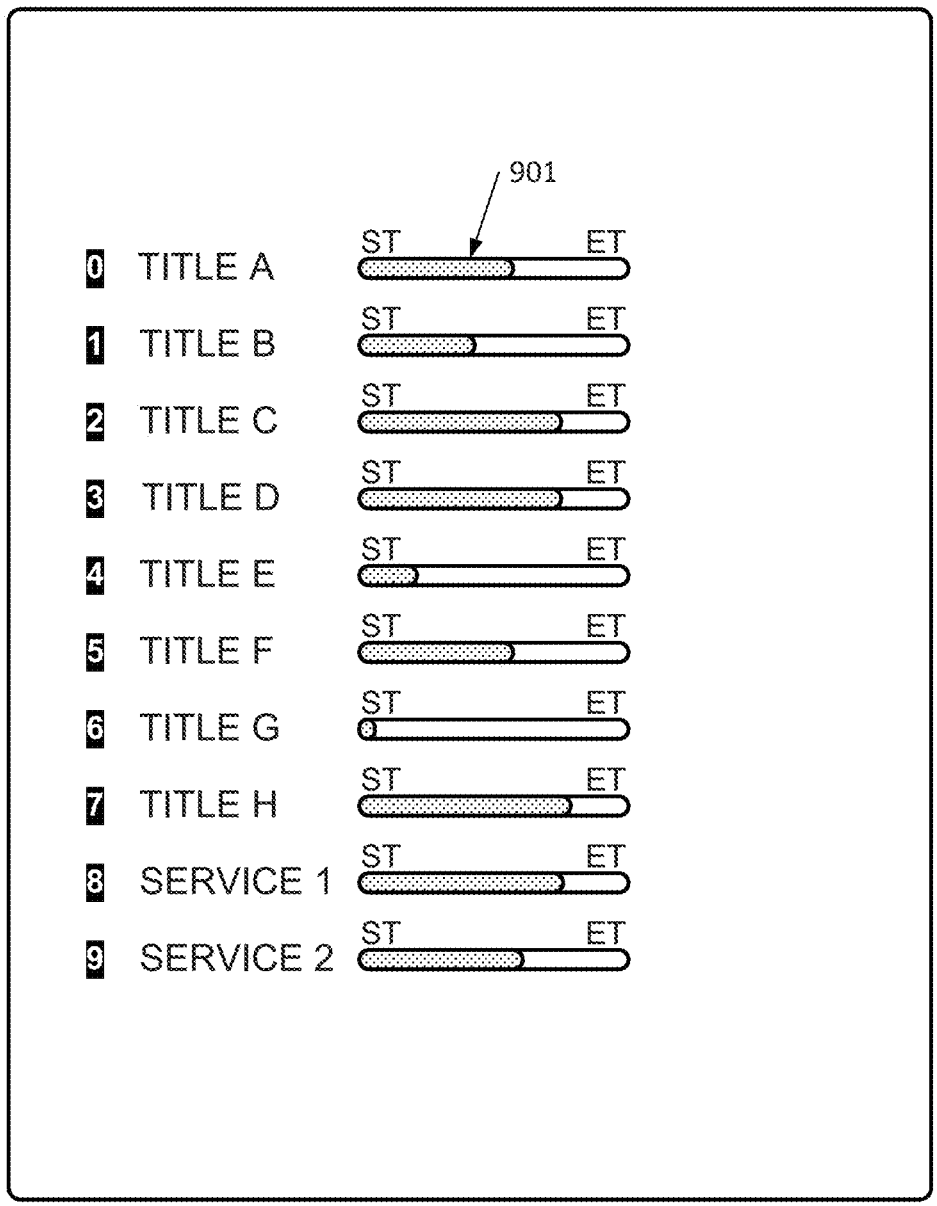

Another example of how to points in progress of content items may be indicated in a user interface is shown in FIG. 9. In this example, the user interface includes a list of items (e.g., Title A through Title H) of content and/or services (e.g., Service 1 and Service 2) that present items of content, with each item of content and/or services having an associated displayed progress indicator. In this example, the progress indicators are progress bars (e.g., progress bar 901). However, the progress indicators in the user interface of FIG. 9 (and in the user interfaces of any of the other figures herein) may be any other types of progress indicators, such as but not limited to pie chart indicators, lines, altered borders, etc.

Also, in any of the example user interfaces discussed herein, the progress indicator may additionally or alternatively be presented to indicate one of a smaller subset of possible points in progress. For example, rather than having, say, 100 possible states of the progress indicator (e.g., corresponding to 0 through 99 percent of progress through the content), or even more, there may be only, e.g., two, three, or four states that the progress indicator may attain. For example, a first state may indicate that the point in progress is within a first range of progress (e.g., between 0% and 24% progress through the content), a second state may indicate that the point in progress is within a different second range of progress (e.g., between 25% and 49% progress through the content), a third state may indicate that the point in progress is within a different third range of progress (e.g., between 50% and 74% progress through the content), and a fourth state may indicate that the point in progress is within a different fourth range of progress (e.g., between 75% and 100% progress through the content). Thus, for instance, the progress indicator within a given range may appear the same until the point in progress advances to the next range, at which time the progress indicator may change to indicate the next range of point in progress.

Further examples of how the point in progress may be indicated (which may include those already discussed) include presenting some or all of the progress indicator in a particular color, size, pattern, shape, position, orientation, thickness, width, height, animation speed, and/or three-dimensional depth that depends partially or fully on the point in progress.

Figure 10:
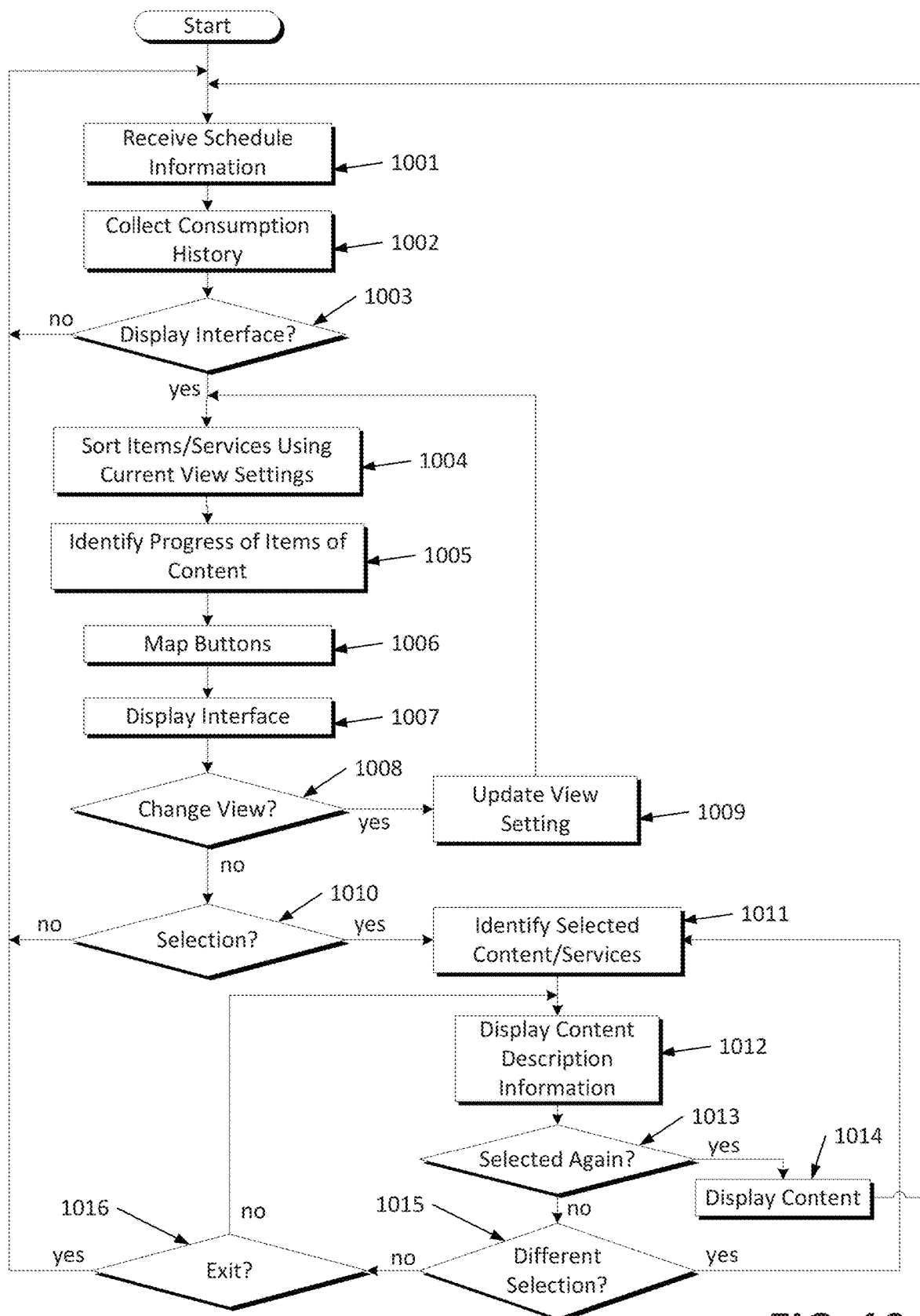
FIG. 10 is a flow chart showing examples steps that may be performed in accordance with one or more aspects described herein.

FIG. 10 is a flow chart showing example methods that may be performed. The methods may be performed, in whole or in part, by one or more computing devices, such as by any one or more of the elements of FIGS. 1 and 2. While particular devices may be identified with various steps in the flow chart, these are merely examples; any one or more devices may perform any of the steps. Some of the steps may be omitted or performed in a different order without departing from the scope of the disclosure.

At step 1001, a user device, such as any of the elements of premises 102 or any other devices such as devices communicating via a cellular phone network, may receive schedule information from the network (e.g., from content server 106 via link 101, the cellular network, etc.). The schedule information may include, for example, information identifying which items of content are scheduled to be presented, at what times, on what channels or other services, the content titles, and/or other information. At step 1002, the user device may collect the user's content consumption history, which may include information indicating, for instance, which items of content have already been viewed (or at least partially viewed), which items of content have been tagged as favorites, which items of content have been set for recording, etc. The content consumption history may be provided to the user device from the network (e.g., from content server 106 via link 101, the cellular network, etc.), and/or the content consumption history may be stored in local data storage (e.g., memory) of the user device. The schedule information and the content consumption history may be used together by the user device to generate the user interface.

At step 1003, the user device and/or a network element such as one of the servers 105-107, for instance, may determine whether it is desired by the user (or by software of the user device) to display the user interface (e.g., a content guide). For example, the user may select a "show guide" button or other selection displayed by the device via a user interface. If not, then the process may return, e.g., to step 1001 for further updates to the schedule information. In other examples, the process may not retrieve the schedule information until it is desired (e.g., until the user has requested) to display the user interface.

At step 1004, the user device and/or a network element such as one of the servers 105-107, for instance, may sort the displayed order of the various services and/or items of content on which the items of content are to be provided. For example, the sorting may involve sorting and/or filtering the items of content and/or services such that only a subset of the items of content and/or services in the schedule information are to be displayed to the user as tiles, and/or that the order of the tiles to be displayed are arranged in accordance with the sorting. The sorting may include sorting, for instance, by time (e.g., tiles for those items of content that are scheduled to be presented soon or that are already in progress may be displayed first), by name or title (e.g., alphabetically), by genre, by rating, by type (e.g., movie, television program, series, live, on-demand, etc.), by user-defined favorites, by service, and/or the like.

At step 1005, the user device and/or a network element such as one of the servers 105-107, for instance, may identify the point in progress for each of the items of content in the user interface. The point in progress in this example may be, as described previously, the location within an item of content that is currently being presented through the network to one or more user devices. This may involve, for instance, comparing the current time with the scheduled presentation timeframe of an item of content. If the current time is past the scheduled start time, then the point in progress may be, or otherwise be based on, the difference between the current time and the scheduled start time. In other examples, for instance where the scheduled start time may be unreliable or may not be scheduled (such as where the item of content is an on-demand item of content), determining the point in progress may involve querying from the network the current point at which the item of content is being presented.

Figure 11:
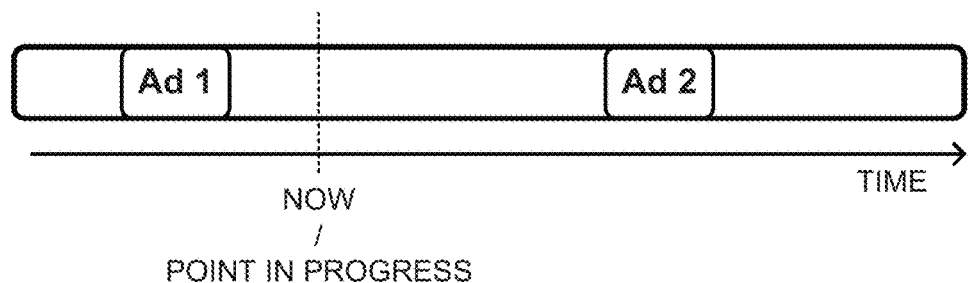
FIGS. 11-14 are examples diagrams of an item of content over time in accordance with one or more aspects described herein.
Figure 12:
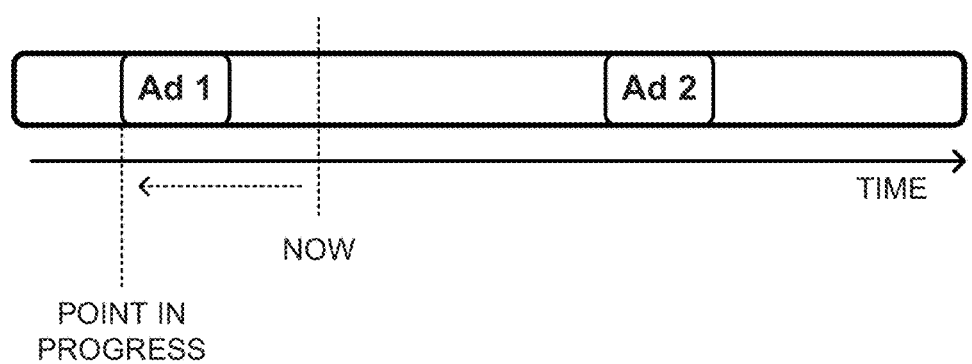
Figure 13:
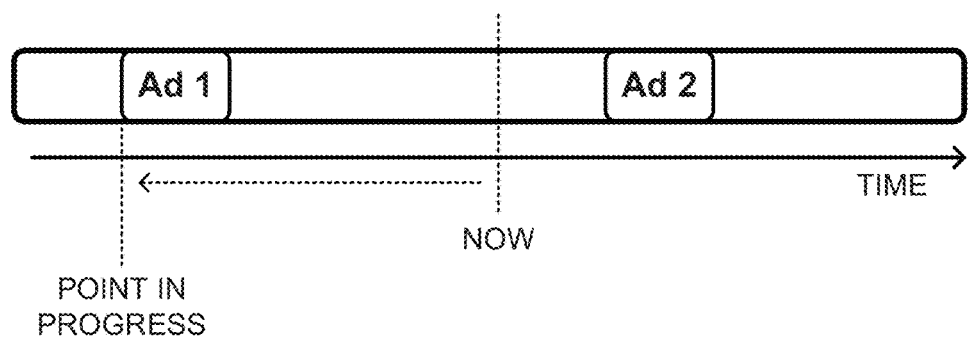
Figure 14:
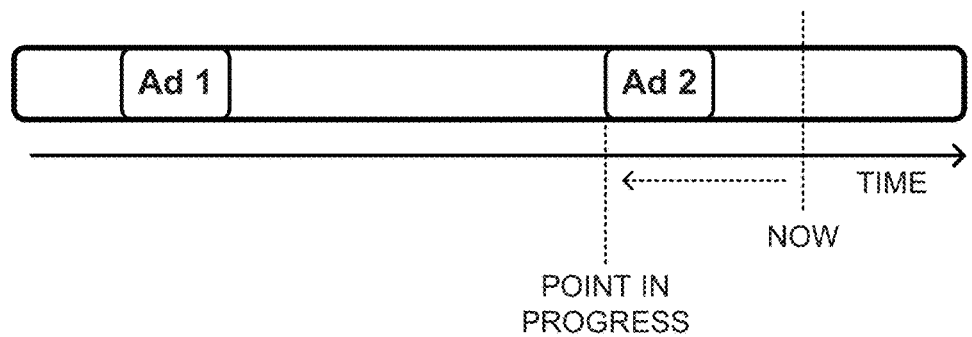

In some examples, the point in progress for a given item of content may be the current playback location in the item of content, such as shown in FIG. 11 (where "NOW" indicates the current playback location). In further examples, the point in progress may be based on the current playback location within an item of content that is currently being presented through the network to one or more user devices, even if the point in progress is not actually the location. For example, the point in progress may differ from the location within the item of content by a fixed amount, such as X (e.g., ten) seconds of playback before the current location or X (e.g., ten) seconds of playback after the current location within the item of content). Or, where the item of content contains advertising, the point in progress may be the beginning of one of the previous (or future) advertising slots within the item of content. Examples of this are shown in FIGS. 12-14. In FIG. 12, an item of content may contain two advertising slots (Ad 1 and Ad 2), and the current playback location ("NOW") is shown relative to the point in progress, which is at the beginning of Ad 1. In FIG. 13, the current playback location has moved forward, and the point in progress in this example is still at the beginning of Ad 1. In FIG. 14, the current playback location has moved past Ad 2, and now the point in progress is at the beginning of the Ad 2 slot. The point in progress as indicated in the user interface may be in accordance with any of these examples and/or in accordance with other configurations.

At step 1006, the user device and/or a network element such as one of the servers 105-107, for instance, may determining a mapping of remote control buttons (which may be considered quick-tune buttons) and/or other user interface elements with one or more of the tiles that are displayed in the user interface. For example, as discussed above, the numeric digits (0-9) may be mapped to ten of the tiles, and other keys on the remote control (e.g., a "Back" or "Next" key) may be mapped to other tiles. Each tile may be displayed with a visual overlay of its mapped key, and the user can select a tile by pressing its mapped key. Doing so may result in the display of additional information about the selected tile's corresponding item or content and/or service (e.g., information describing the service and/or the item of content currently being transmitted on that service). The user may press the same mapped key again to select the service, and to begin receiving and consuming the service's content (e.g., tuning to NBC). Examples of such mapping are indicated in the user interfaces of FIGS. 4-9. For example, referring to the user interface of FIG. 4, if the user presses the "0" remote control button, then the content associated with content tile 401-A may be selected, if the user presses the "1" remote control button, then the content associated with content tile 401-B may be selected, and if the user presses the "2" remote control button, then the content associated with content tile 401-C may be selected, etc.

At step 1007, the user device and/or a network element such as one of the servers 105-107, for instance, may cause the user interface to be displayed at a display of the user device, such as in the form of a graphical and/or textual user interface. The user interface may have any appearance, such as but not limited to the form of any of the user interfaces of FIGS. 4-9. The display of the user device may be physically integrated with the user device (e.g., where the user device is a tablet computer, smart phone, laptop computer, or the like), or the display may be physically separate from the user device (e.g., where the user device is a set-top box and the display is a television set, or where the user device is a desktop computer and the display is a separate computer display, or where the user device otherwise wirelessly or via wire transmits information to be displayed to a separate display device). The user interface may be generated locally by the user device or remotely by a network element such as one of the servers 105-107.

At step 1008, the user device and/or a network element such as one of the servers 105-107, for instance, may determine whether the user interface as displayed should be updated, such as by changing what is displayed. This may occur for any of a variety of reasons. For example, the points in progress in the various items of content for which tiles are displayed may change over time, or a user input such as selection of a tile or scrolling through the tiles may invoke a change in the displayed user interface. Or, the user may make a selection that changes the way the user interface is displayed, such as by changing from one of the layouts in one of the FIGS. 4-9 to another of the layouts in another of the FIGS. 4-9. If the user interface as displayed is to be changed, then the process may move to step 1009, in which the user interface is updated and the process returns to step 1004. Otherwise, the process may move to step 1010.

At step 1010, the user device and/or a network element such as one of the servers 105-107, for instance, may determine whether one of the mapped keys has been selected by the user, and/or whether the user has otherwise selected one of the items of content (e.g., by touching or clicking on the tile or other representation for the item of content). As discussed above, some or all of the tiles displayed in the user interface may be associated with (mapped to) a different user-selectable key, such as a key on the user's remote control device, keyboard, or other user input device. For instance, referring to FIGS. 4-9, the tiles (e.g., tiles 401) and/or other representations are displayed with associated numbers, which indicate the mapping of items of content with keys. Again, while number keys are mapped in this example, other types of keys, such as alphabetic or symbolic keys, may be additionally or alternatively mapped to items of content. The user may alternatively select one of items or content and/or services at step 1010 by, for instance, touching the tile or progress bar for the item of content and/or service (where the user interface is displayed on a touch-sensitive display device), using a mouse or other pointing device to select the tile or progress bar, or the like.

If an item of content or service is not determined at step 1010 as being selected by the user, then the process may return to step 1001 or to another earlier step. If an item of content or service is determined at step 1010 as being selected, then the process may move to step 1011, in which the selected item of content or service is determined.

In response to detecting that an item of content or service has been selected, the process may, at step 1012, display information about the mapped item of content or service, such as but not limited to the full content title, actors, directors, and other contributors to the item of content, service information, length, future showings of the item of content, a description of the plot, and/or other information associated with the item of content. If the same mapped key is selected again or if the same item of content or service is otherwise selected again at step 1013, then the process may move to step 1014. If a different item of content or service is selected at step 1013, or if after a predetermined timeout period no item of content is further selected, then the process may move to step 1015. Thus, in some embodiments, pressing a mapped key once (e.g., on a remote control) may cause information about the selected item of content to be displayed (e.g., at step 1012), and pressing the same mapped key again may cause the item of content itself to be presented (e.g., both video and audio of the content, depending upon the content). This may be convenient in that the user may not need to move his or her finger from the mapped button in order to both see information about the content and consume the content. In other embodiments, an item of content or service need be selected only once (e.g., a mapped key need be pressed only once) to cause the process to move to step 1014, such that the process may move from step 1010 directly to step 1014.

At step 1014, the user device and/or a network element such as one of the servers 105-107, for instance, may cause the user device (or another device) to begin accessing (e.g., obtaining, receiving, displaying, recording, downloading, linking to, and/or tuning to) the selected item of content. Thus, the user may begin watching the desired item of content and/or service via the user device and/or via another device such as a personal computer, television set, set-top box, smart phone, tablet computer, and/or the like. The content may be displayed beginning at the current point in progress or at a location within the item of content that depends upon the point in progress. For example, if the point in progress is the current playback location of the item of content, then the content may be displayed beginning at the point in progress or at a location within the item of content that is determined based on the point in progress (such as at the nearest earlier advertising slot, or a certain number of seconds prior to the point in progress, etc.). Where the item of content is a multicast item of content (multicast to a plurality of devices) rather than an on-demand item of content, the point in progress may be the current playback location being transmitted in the multicast, and the item of content may be expected to be displayed beginning at that current playback location (or at a location that is based on that current playback location). The process may then return to step 1001 or to another step as desired. For instance, the user interface may no longer be displayed while the item of content is being displayed. In this case, the user interface may not be determined and/or displayed (such as beginning at step 1004) until the item of content has ceased being displayed. Alternatively, the user interface may be displayed simultaneously with the item of content being displayed. In this case, the process may immediately return to an earlier step as appropriate for continuing to display the user interface with any updated information as appropriate.

If, at step 1014, a different item of content or service has been selected, then the process may return to step 1011. If no further selection is made from step 1014, then the process may move to step 1015 and then to step 1016 to determine whether the user interface should be exited. If another item of content or service is determined at step 1015 to have been selected, then the process may move to step 1011.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting.

The invention claimed is:

1. An apparatus comprising:
one or more processors; and
memory storing instructions, that when executed by the one or more processors, cause the apparatus to:
generate a user interface comprising a plurality of selectable images in a content listing, wherein each of the selectable images corresponds to an item of content of a plurality of items of content, and wherein at least one of the selectable images comprises a left region and a right region having different heights, and wherein widths of the left region and the right region are based on a point in progress of a corresponding one of the plurality of items of content; and
change, based on a change in the point in progress of the corresponding one of the plurality of items of content, the width of the left region and the width of the right region.

2. The apparatus of claim 1, wherein the left region comprises a shaded area.

3. The apparatus of claim 1, wherein the left region is displayed using a first color palette and the right region is displayed using a different second color palette.

4. The apparatus of claim 1, wherein the instructions, when executed by the one or more processors, further cause the apparatus to:
periodically update, during display of the user interface and based on one or more additional changes in the point in progress of the corresponding one of the plurality of items of content, the at least one of the selectable images.

5. The apparatus of claim 1, wherein the instructions, when executed by the one or more processors, further cause the apparatus to:
use a black-and-white palette for selectable images, of the plurality of selectable images, corresponding to content items that were accessed within a user-configured amount of time-; and
use a color palette for selectable images, of the plurality of selectable images, corresponding to content items that were not accessed within the user-configured amount of time.

6. The apparatus of claim 1, wherein one or more of the plurality of items of content comprises a scheduled item of content, and wherein the left region of a corresponding selectable image represents a portion of the scheduled item of content scheduled for the past.

7. The apparatus of claim 1, wherein the point in progress comprises a location currently accessed within the corresponding one of the plurality of items of content.

8. The apparatus of claim 1, wherein each of the plurality of selectable images comprises an image from a corresponding one of the plurality of items of content.

9. The apparatus of claim 1, wherein the instructions, when executed by the one or more processors, further cause the apparatus to:
update the at least one of the selectable images to comprise a new image of the corresponding one of the plurality of items of content at the change in the point in progress.

10. The apparatus of claim 1, wherein the instructions, when executed by the one or more processors, further cause the apparatus to:
map the at least one of the selectable images to one or more buttons of a user device; and
cause display of the at least one of the selectable images overlaid with a respectively mapped button identification.

11. The apparatus of claim 1, wherein the instructions, when executed by the one or more processors, cause the apparatus to:
change the width of the left region and the width of the right region by causing a portion of the at least one of the selectable images to transition between the left region and the right region.

12. The apparatus of claim 1, wherein the at least one of the selectable images comprises a foreground image overlaying a background image, and wherein the instructions, when executed by the one or more processors, cause the apparatus to:
change the width of the left region and the width of the right region by modifying the background image without modifying the foreground image.

13. The apparatus of claim 1, wherein the at least one of the selectable images further comprises a progress indicator between the left region and the right region and between an upper boundary of the left region and an upper boundary of the right region.

14. An apparatus comprising:
one or more processors; and
memory storing instructions, that when executed by the one or more processors, cause the apparatus to:
generate a user interface comprising a plurality of images corresponding to points in progress of a plurality of items of content,
wherein, for a particular image:
the image comprises a first region and a second region,
the first region comprises a first height, and the second region comprises a second height different from the first height, and
a width of the first region and a width of the second region depend on a point in progress of a corresponding one of the plurality of items of content;
map the plurality of images to a plurality of buttons of a user device; and
cause display of the plurality of images overlaid with corresponding mapped button identifications.

15. The apparatus of claim 14, wherein the instructions, when executed by the one or more processors, further cause the apparatus to:
update the particular image to comprise a new image of the corresponding one of the plurality of items of content at a changed point in progress.

16. The apparatus of claim 14, wherein the instructions, when executed by the one or more processors, further cause the apparatus to:
change, based on a change in the point in progress, the width of the first region and the width of the second region.

17. The apparatus of claim 14, wherein the second region is rectangular in shape.

18. An apparatus comprising:
one or more processors; and
memory storing instructions, that when executed by the one or more processors, cause the apparatus to:
generate a tiled user interface comprising a plurality of representations, each of the plurality of representations corresponding to one of a plurality of media items,
wherein at least one of the plurality of representations comprises a left region and a right region having different heights, and
wherein a relative width of the left region to the right region depends on a point in progress of a corresponding one of the plurality of media items;
determine, based on communicating with a user device, a physical layout of buttons of the user device;
adjust, based on the determined physical layout of buttons, a layout of the plurality of representations; and
map the plurality of representations to the buttons such that the adjusted layout of the plurality of representations of the user interface corresponds to the determined physical layout of the buttons.

19. The apparatus of claim 18, wherein the corresponding one of the plurality of media items comprises a media item currently in progress, and wherein the left region represents progress of a portion of the media item from a start time to a current time.

20. The apparatus of claim 18, wherein the instructions, when executed by the one or more processors, further cause the apparatus to:
cause display of, on one or more of the plurality of representations, an indication of the mapping.

21. The apparatus of claim 18, wherein the instructions, when executed by the one or more processors, further cause the apparatus to:
cause to be displayed, based on a user selection of one of the buttons, information about the one of the plurality of media items corresponding to a representation, of the plurality of representations, mapped to the one of the buttons; and
cause, based on a subsequent user selection of the one of the buttons during display of the information, the one of the plurality of media items to be accessed.

22. The apparatus of claim 18, wherein the instructions, when executed by the one or more processors, further cause the apparatus to:
update the at least one of the plurality of representations to comprise an image corresponding to a change in the point in progress of the corresponding one of the plurality of media items.

23. The apparatus of claim 18, wherein the at least one of the plurality of representations comprises an image and an overlay,
   wherein the overlay comprises the left region and the right region and overlays the image, and
   wherein a height of the left region is greater than a height of the right region.

24. One or more non-transitory computer readable media storing instructions that, when executed, cause:
   generating a user interface comprising a plurality of selectable images in a content listing, wherein each of the selectable images corresponds to an item of content of a plurality of items of content, and wherein at least one of the selectable images comprises a left region and a right region having different heights, and wherein widths of the left region and the right region are based on a point in progress of a corresponding one of the plurality of items of content; and
   changing, based on a change in the point in progress of the corresponding one of the plurality of items of content, the width of the left region and the width of the right region.

25. The one or more non-transitory computer readable media of claim 24, wherein the left region comprises a shaded area.

26. The one or more non-transitory computer readable media of claim 24, wherein the left region is displayed using a first color palette and the right region is displayed using a different second color palette.

27. The one or more non-transitory computer readable media of claim 24, wherein the instructions, when executed further cause:
   periodically updating, during display of the user interface and based on one or more additional changes in the point in progress of the corresponding one of the plurality of items of content, the at least one of the selectable images.

28. The one or more non-transitory computer readable media of claim 24, wherein the instructions, when executed further cause:
   using a black-and-white palette for selectable images, of the plurality of selectable images, corresponding to content items that were accessed within a user-configured amount of time; and
   using a color palette for selectable images, of the plurality of selectable images, corresponding to content items that were not accessed within the user-configured amount of time.

29. The one or more non-transitory computer readable media of claim 24, wherein one or more of the plurality of items of content comprises a scheduled item of content, and wherein the left region of a corresponding selectable image represents a portion of the scheduled item of content scheduled for the past.

30. The one or more non-transitory computer readable media of claim 24, wherein the point in progress comprises a location currently accessed within the corresponding one of the plurality of items of content.

31. The one or more non-transitory computer readable media of claim 24, wherein each of the plurality of selectable images comprises an image from a corresponding one of the plurality of items of content.

32. The one or more non-transitory computer readable media of claim 24, wherein the instructions, when executed further cause:
   updating the at least one of the selectable images to comprise a new image of the corresponding one of the plurality of items of content at the change in the point in progress.

33. The one or more non-transitory computer readable media of claim 24, wherein the instructions, when executed further cause:
   mapping the at least one of the selectable images to one or more buttons of a user device; and
   causing display of the at least one of the selectable images overlaid with a respectively mapped button identification.

34. The one or more non-transitory computer readable media of claim 24, wherein the instructions, when executed cause:
   changing the width of the left region and the width of the right region by causing a portion of the at least one of the selectable images to transition between the left region and the right region.

35. The one or more non-transitory computer readable media of claim 24, wherein the at least one of the selectable images comprises a foreground image overlaying a background image, and wherein the instructions, when executed cause:
   changing the width of the left region and the width of the right region by modifying the background image without modifying the foreground image.

36. The one or more non-transitory computer readable media of claim 24, wherein the at least one of the selectable images further comprises a progress indicator between the left region and the right region and between an upper boundary of the left region and an upper boundary of the right region.

37. One or more non-transitory computer readable media storing instructions that, when executed, cause:
   generating a user interface comprising a plurality of images corresponding to points in progress of a plurality of items of content,
   wherein, for a particular image:
      the image comprises a first region and a second region,
      the first region comprises a first height, and the second region comprises a second height different from the first height, and
      a width of the first region and a width of the second region depend on a point in progress of a corresponding one of the plurality of items of content;
   mapping the plurality of images to a plurality of buttons of a user device; and
   causing display of the plurality of images overlaid with corresponding mapped button identifications.

38. The one or more non-transitory computer readable media of claim 37, wherein the instructions, when executed further cause:
   updating the particular image to comprise a new image of the corresponding one of the plurality of items of content at a changed point in progress.

39. The one or more non-transitory computer readable media of claim 37, wherein the instructions, when executed further cause:
   changing, based on a change in the point in progress, the width of the first region and the width of the second region.

40. The one or more non-transitory computer readable media of claim 37, wherein the second region is rectangular in shape.

41. One or more non-transitory computer readable media storing instructions that, when executed, cause:
- generating a tiled user interface comprising a plurality of representations, each of the plurality of representations corresponding to one of a plurality of media items,
    - wherein at least one of the plurality of representations comprises a left region and a right region having different heights, and
    - wherein a relative width of the left region to the right region depends on a point in progress of a corresponding one of the plurality of media items;
- determining, based on communicating with a user device, a physical layout of buttons of the user device;
- adjusting, based on the determined physical layout of buttons, a layout of the plurality of representations; and
- mapping the plurality of representations to the buttons such that the adjusted layout of the plurality of representations of the user interface corresponds to the determined physical layout of the buttons.

42. The one or more non-transitory computer readable media of claim 41, wherein the corresponding one of the plurality of media items comprises a media item currently in progress, and wherein the left region represents progress of a portion of the media item from a start time to a current time.

43. The one or more non-transitory computer readable media of claim 41, wherein the instructions, when executed further cause:
- causing display of, on one or more of the plurality of representations, an indication of the mapping.

44. The one or more non-transitory computer readable media of claim 41, wherein the instructions, when executed further cause:
- causing to be displayed, based on a user selection of one of the buttons, information about the one of the plurality of media items corresponding to a representation, of the plurality of representations, mapped to the one of the buttons; and
- causing, based on a subsequent user selection of the one of the buttons during display of the information, the one of the plurality of media items to be accessed.

45. The one or more non-transitory computer readable media of claim 41, wherein the instructions, when executed further cause:
- updating the at least one of the plurality of representations to comprise an image corresponding to a change in the point in progress of the corresponding one of the plurality of media items.

46. The one or more non-transitory computer readable media of claim 41, wherein the at least one of the plurality of representations comprises an image and an overlay,
- wherein the overlay comprises the left region and the right region and overlays the image, and
- wherein a height of the left region is greater than a height of the right region.

* * * * *